(12) United States Patent
Faccin et al.

(10) Patent No.: US 10,349,329 B2
(45) Date of Patent: Jul. 9, 2019

(54) MECHANISMS FOR DIFFERENTIATED TREATMENT OF OFFLOADED TRAFFIC

(71) Applicant: QUALCOMM Incorporated, San Diego, CA (US)

(72) Inventors: Stefano Faccin, San Ysidro, CA (US); Haris Zisimopoulos, London (GB); Ozcan Ozturk, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 15/183,218

(22) Filed: Jun. 15, 2016

(65) Prior Publication Data

US 2017/0034756 A1 Feb. 2, 2017

Related U.S. Application Data

(60) Provisional application No. 62/198,026, filed on Jul. 28, 2015.

(51) Int. Cl.
*H04W 36/22* (2009.01)
*H04W 16/14* (2009.01)
(Continued)

(52) U.S. Cl.
CPC .......... *H04W 36/22* (2013.01); *H04W 16/14* (2013.01); *H04W 28/0268* (2013.01);
(Continued)

(58) Field of Classification Search
CPC ..... H04W 16/14; H04W 16/00; H04W 16/18; H04W 16/24; H04W 28/08; H04W 36/0022; H04W 36/22; H04W 88/06
See application file for complete search history.

(56) References Cited

U.S. PATENT DOCUMENTS 9,509,575 B2 * 11/2016 Zhang ................... H04L 43/028
9,722,929 B2 *  8/2017 Miklos ................... H04L 47/24
(Continued)

OTHER PUBLICATIONS

Ericsson: "GAN & Home Zone Cell Charging, Handling of Changed Cell Characteristics," 3GPP Draft; S2-060287, 3rd Generation Partnership Project (3GPP), Mobile Competence Centre ; 650, Route Des Lucioles ; F-06921 Sophia-Antipolis Cedex ; France, vol. SA WG2, No. Budapest; Jan. 10, 2006, Jan. 10, 2006 (Jan. 10, 2006), XP050254642, [retrieved on Jan. 10, 2006], 4 pages.
(Continued)

*Primary Examiner* — Hassan Kizou
*Assistant Examiner* — Roberta A. Shand
(74) *Attorney, Agent, or Firm* — Arent Fox, LLP

(57) ABSTRACT

Communication using a radio access network (RAN) including a primary cell for license spectrum access and a secondary cell for unlicensed spectrum access may be improved to provide optimal performance while considering characteristics of the primary cell and the secondary cell. The apparatus may be a core network entity. The core network entity is connected to a RAN including a primary cell utilizing a licensed spectrum and a secondary cell utilizing an unlicensed spectrum. The core network entity determines an authorization for data traffic to be offloaded to the secondary cell based on data traffic characteristics. The core network transmits an indication of the authorization to the RAN.

30 Claims, 22 Drawing Sheets

(51) Int. Cl.
*H04W 28/02* (2009.01)
*H04W 28/06* (2009.01)
*H04W 48/06* (2009.01)
*H04W 88/06* (2009.01)
*H04W 28/08* (2009.01)
*H04W 48/14* (2009.01)

(52) U.S. Cl.
CPC ......... *H04W 28/065* (2013.01); *H04W 28/08* (2013.01); *H04W 48/06* (2013.01); *H04W 88/06* (2013.01); *H04W 48/14* (2013.01)

(56) References Cited

U.S. PATENT DOCUMENTS

| | | | | |
|---|---|---|---|---|
| 9,775,079 | B2* | 9/2017 | Cheng | H04W 8/082 |
| 9,826,103 | B2* | 11/2017 | Sharma | H04M 15/67 |
| 9,872,213 | B2* | 1/2018 | Mutikainen | H04W 36/04 |
| 2011/0058479 | A1* | 3/2011 | Chowdhury | H04L 45/04 370/237 |
| 2012/0324100 | A1 | 12/2012 | Tomici et al. | |
| 2013/0303114 | A1* | 11/2013 | Ahmad | H04W 16/14 455/406 |
| 2014/0241317 | A1* | 8/2014 | Jamadagni | H04L 5/0032 370/331 |
| 2014/0328182 | A1* | 11/2014 | Gao | H04W 28/08 370/236 |
| 2015/0043435 | A1* | 2/2015 | Blankenship | H04L 69/322 370/329 |
| 2015/0063295 | A1* | 3/2015 | Himayat | H04W 36/0022 370/331 |
| 2015/0148046 | A1* | 5/2015 | Lim | H04W 36/22 455/444 |
| 2015/0271093 | A1* | 9/2015 | Cui | H04W 4/70 370/329 |
| 2016/0183148 | A1* | 6/2016 | Worrall | H04W 36/22 370/235 |

OTHER PUBLICATIONS

International Search Report and Written Opinion—PCT/US2016/037885—ISA/EPO—dated Nov. 16, 2016.
Nsn et al., "Using DSCP for Packet Marking," 3GPP Draft; S2-141058 UPCON P-CR DSCP-for-Packet-Marking-V4, 3rd Generation Partnership Project (3GPP), Mobile Competence Centre ; 650, Route Des Lucioles ; F-06921 Sophia-Antipolis Cedex ; France vol. SA WG2, No. St. Julian; Mar. 24, 2014-Mar. 28, 2014 Mar. 23, 2014 (Mar. 23, 2014), XP050804542, Retrieved from the Internet: URL:http://www.3gpp.org/ftp/Meetings_3GPP_SYNC/SA2/Docs/ [retrieved on Mar. 23, 2014], 9 pages.
Vodafone: "Requirements on the Use of Cell Identity, Cell Type (RAT) and Cell Capability Information for Charging, Services Rendering and Network Dimensioning," 3GPP Draft; S1-060016, 3rd Generation Partnership Project (3GPP), Mobile Competence Centre ; 650, Route Des Lucioles ; F-06921 Sophia-Antipolis Cedex ; France, vol. SA WG1, No. Denver; Jan. 30, 2006, Jan. 30, 2006 (Jan. 30, 2006), XP050224385, [retrieved on Jan. 30, 2006], 3 pages.
Intel Corporation: "CN Impacts of WLAN/3GPP Radio Interworking WI", 3GPP Draft, R2-140804 Wlan-3GPP Interworking Solution CN Impacts-V7, 3rd Generation Partnership Project (3GPP), Mobile Competence Centre, 650, Route Des Lucioles, F-06921 Sophia-Antipolis Cedex, Fr, vol. RAN WG2, No. Prague, Czech Republic, 20140210-20140214 Feb. 9, 2014 (Feb. 9, 2014), XP050792089, pp. 1-7, Retrieved from the Internet: URL: http://www.3gpp.org/ftp/Meetings_3GPP_SYNC/RAN2/Docs [retrieved on Feb. 9, 2014] 1. Introduction CN support for RAN without ANDSF A.1 (Offloading Schemes) Proposal 6.
ITRI: "Discussion on Traffic Steering with Considering the Co-existence with other 3GPP/WLAN Interworking Solutions", 3GPP Draft, R2-152355 LTE+WLAN_Co-Existence, 3rd Generation Partnership Project (3GPP), Mobile Competence Centre, 650, Route Des Lucioles, F-06921 Sophia-Antipolis Cedex, France, vol. RAN WG2, No. Fukuoka, Japan; 20150525-20150529 May 15, 2015 (May 15, 2015), XP050971512, 2 pages, Retrieved from the Internet: URL: http://www.3gpp.org/ftp/tsg_ran/WG2_RL2/TSGR2_90/Docs [retrieved on May 15, 2015] 2. Discussion Proposals 1, 2.
New Postcom: "Considerations on Requirements and Scenarios of WLAN/3GPP Radio", 3GPP Draft, R2-130270 Considerations on Requirements and Scenarios of WLAN and 3GPP Radio Interworking, 3rd Generation Partnership Project (3GPP), Mobile Competence Centre. 650, Route Des Lucioles, vol. RAN WG2, No. St. Julian, 20130128-20130201 Jan. 19, 2013 (Jan. 19, 2013), XP050668305, 4 pages, Retrieved from the Internet: URL: http://www.3gpp.org/ftp/tsg_ran/WG2_RL2/TSGR2_81/Docs/ [retrieved on Jan. 19, 2013] 2.2 Deployment scenarios pp. 1,2.
Partial International Search Report—PCT/US2016/037885—ISA/EPO—dated Aug. 31, 2016.
Qualcomm Incorporated: "Discussion on System Aspects of LAA and LWA", 3GPP Draft, S2-152188 Discussion on LAA-LWA System Aspects V5, 3rd Generation Partnership Project (3GPP), Mobile Competence Centre, 650, Route Des Lucioles, F-06921 Sophia-Antipolis Cedex, France, vol. SA WG2, No. Dubrovnik, Croatia, 20150706-20150718 Jun. 30, 2015 (Jun. 30, 2015), XP050986882, 2 pages, Retrieved from the Internet: URL:http://www.3gpp.org/ftp/tsg_sa/WG2_Arch/TSGS2_110_Dubrovnik/Docs/ [retrieved on Jun. 30, 2015] 2 Discussion.

* cited by examiner

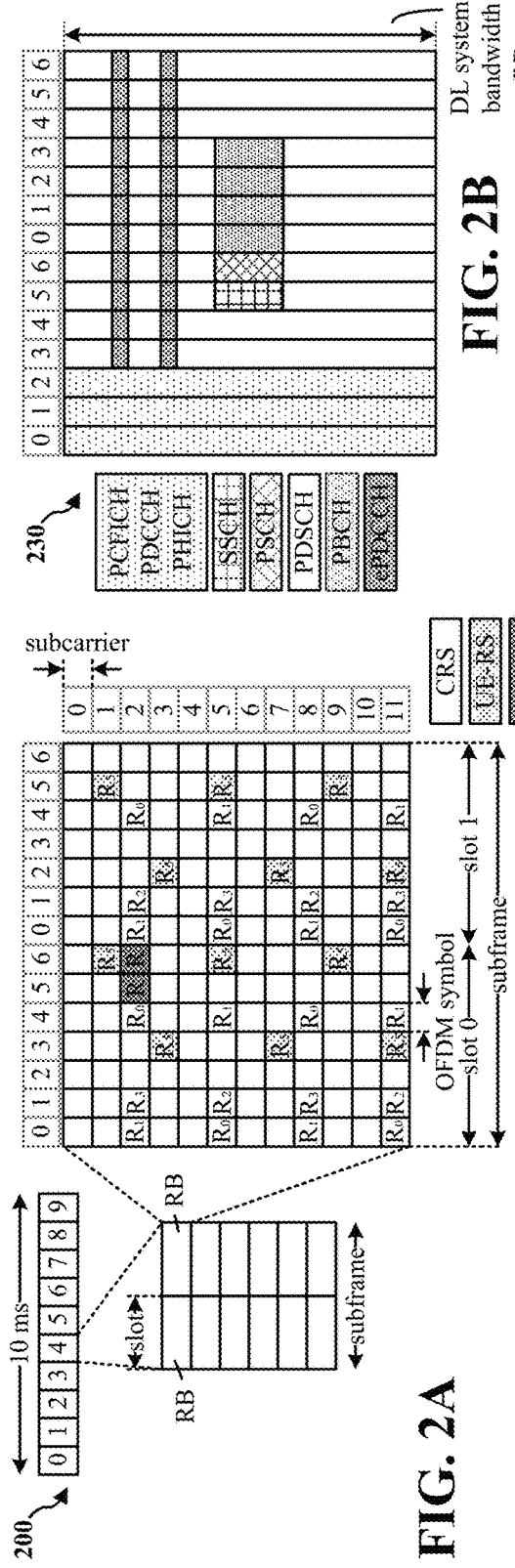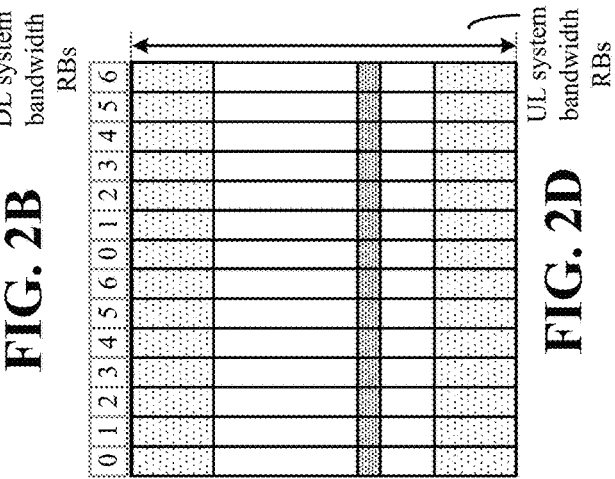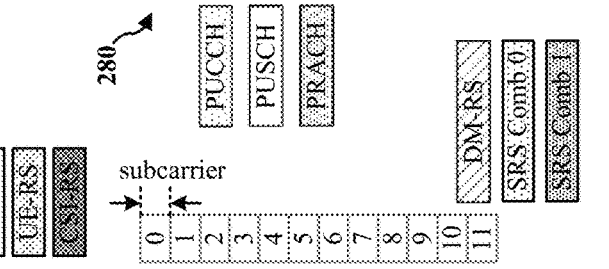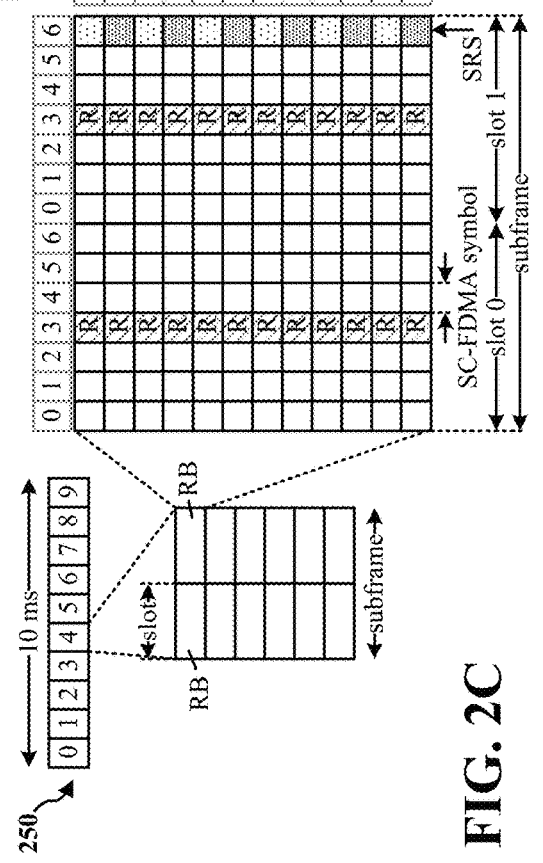
FIG. 2A
FIG. 2B
FIG. 2C
FIG. 2D

MECHANISMS FOR DIFFERENTIATED TREATMENT OF OFFLOADED TRAFFIC

CROSS-REFERENCE TO RELATED APPLICATION(S)

This application claims the benefit of U.S. Provisional Application Ser. No. 62/198,026, entitled "MECHANISMS FOR DIFFERENTIATED TREATMENT OF OFFLOADED TRAFFIC" and filed on Jul. 28, 2015, which is expressly incorporated by reference herein in its entirety.

BACKGROUND

Field

The present disclosure relates generally to communication systems, and more particularly, to communication over a licensed spectrum and/or an unlicensed spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A radio access network may include different types of cells. One cell may be utilized for communication in a licensed spectrum, whereas another cell may be utilized for communication in an unlicensed spectrum. Therefore, usage of the different types of cells may be improved by considering characteristics of the different types of cells.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A radio access network may include a primary cell that is used for communication in a licensed spectrum and a secondary cell that is used for communication in an unlicensed spectrum. When charging for data traffic is performed, a core network should distinguish data traffic over the primary cell from data traffic over the secondary cell. Further, the core network should be able to determine which traffic is transported over what type of cell (whether primary or secondary) based on traffic characteristics. In addition, because charging may be different between two different cells based on charging requirements, a mechanism is needed to differentiate aggregate maximum bit rate values for primary cells and secondary cells.

In an aspect of the disclosure, a method, a computer-readable medium, and an apparatus are provided. The apparatus may be a core network entity. The core network entity is connected to a radio access network (RAN) including a primary cell utilizing a licensed spectrum and a secondary cell utilizing an unlicensed spectrum. The core network entity determines an authorization for data traffic to be offloaded to the secondary cell based on data traffic characteristics. The core network transmits an indication of the authorization to the RAN.

In an aspect, the apparatus may be a core network entity, where the core network entity is connected to a RAN including a primary cell utilizing a licensed spectrum and a secondary cell utilizing an unlicensed spectrum. The core network entity includes means for determining an authorization for data traffic to be offloaded to the secondary cell based on data traffic characteristics and means for transmitting an indication of the authorization to the RAN.

In an aspect, the apparatus may be a core network entity, where the core network entity is connected to a RAN including a primary cell utilizing a licensed spectrum and a secondary cell utilizing an unlicensed spectrum. The core network entity includes a memory and at least one processor coupled to the memory. The at least one processor is configured to: determine an authorization for data traffic to be offloaded to the secondary cell based on data traffic characteristics, and transmit an indication of the authorization to the RAN.

In an aspect, a computer-readable medium storing computer executable code for wireless communication by a core network entity is provided, where the core network entity is connected to a RAN including a primary cell utilizing a licensed spectrum and a secondary cell utilizing an unlicensed spectrum. The computer-readable medium includes code to: determine an authorization for data traffic to be offloaded to the secondary cell based on data traffic characteristics, and transmit an indication of the authorization to the RAN.

In another aspect of the disclosure, a method, a computer-readable medium, and an apparatus are provided. The apparatus may be a core network entity. The core network entity is connected to a RAN including a primary cell utilizing a licensed spectrum and a secondary cell utilizing an unlicensed spectrum. The core network entity receives one or more packets from the RAN, where at least one of the one or more packets is marked with an indication associated with communication via the secondary cell. The core network entity determines a charging operation based on the one or more packets.

In an aspect, the apparatus may be a core network entity, where the core network entity is connected to a RAN including a primary cell utilizing a licensed spectrum and a secondary cell utilizing an unlicensed spectrum. The core network entity includes means for receiving one or more packets from the RAN serving the primary cell, where at least one of the one or more packets is marked with an indication associated with communication via the secondary cell, and means for determining a charging operation based on the one or more packets.

In an aspect, the apparatus may be a core network entity, where the core network entity is connected to a RAN including a primary cell utilizing a licensed spectrum and a secondary cell utilizing an unlicensed spectrum. The core network entity includes a memory and at least one processor coupled to the memory. The at least one processor is configured to: receive one or more packets from the RAN, where at least one of the one or more packets is marked with an indication associated with communication via the secondary cell, and determine a charging operation based on the one or more packets.

In an aspect, a computer-readable medium storing computer executable code for wireless communication by a core network entity is provided, where the core network entity is connected to a RAN including a primary cell utilizing a licensed spectrum and a secondary cell utilizing an unlicensed spectrum. The computer-readable medium includes code to: receive one or more packets from the RAN, where at least one of the one or more packets is marked with an indication associated with communication via the secondary cell, and determine a charging operation based on the one or more packets.

In another aspect of the disclosure, a method, a computer program product, and an apparatus are provided. The apparatus may be a RAN entity. The RAN entity receives, from a core network, an indication for authorization for data traffic to be offloaded to a secondary cell utilizing an unlicensed spectrum, where the indication for authorization is based on data traffic characteristics. The RAN entity determines based on the indication for authorization, to communicate via at least one of a primary cell utilizing a licensed spectrum or the secondary cell utilizing the unlicensed spectrum, the primary cell and the secondary cell being included in a RAN.

In an aspect, the apparatus may be a RAN entity. The RAN entity includes means for receiving, from a core network, an indication for authorization for data traffic to be offloaded to a secondary cell utilizing an unlicensed spectrum, wherein the indication for authorization is based on data traffic characteristics, and means for determining, based on the indication for authorization, to communicate via at least one of a primary cell utilizing a licensed spectrum or the secondary cell utilizing the unlicensed spectrum, the primary cell and the secondary cell being included in a RAN.

In an aspect, the apparatus may be a RAN entity, where the RAN entity includes a memory and at least one processor coupled to the memory. The at least one processor is configured to: receive, from a core network, an indication for authorization for data traffic to be offloaded to a secondary cell utilizing an unlicensed spectrum, where the indication for authorization is based on data traffic characteristics, and determine based on the indication for authorization, to communicate via at least one of a primary cell utilizing a licensed spectrum or the secondary cell utilizing the unlicensed spectrum, the primary cell and the secondary cell being included in a RAN.

In an aspect, a computer-readable medium storing computer executable code for wireless communication by a RAN entity is provided. The computer-readable medium includes code to: receive, from a core network, an indication for authorization for data traffic to be offloaded to a secondary cell utilizing an unlicensed spectrum, where the indication for authorization is based on data traffic characteristics, and determine based on the indication for authorization, to communicate via at least one of a primary cell utilizing a licensed spectrum or the secondary cell utilizing the unlicensed spectrum, the primary cell and the secondary cell being included in a RAN.

In another aspect of the disclosure, a method, a computer program product, and an apparatus are provided. The apparatus may be a RAN entity for a RAN that includes a primary cell utilizing the licensed spectrum and a secondary cell utilizing the unlicensed spectrum. The RAN entity marks at least one of one or more packets by adding an indication associated with communication via the secondary cell. The RAN entity transmits the marked at least one of one or more packets to a core network.

In an aspect, the apparatus may be a RAN entity for a RAN that includes a primary cell utilizing the licensed spectrum and a secondary cell utilizing the unlicensed spectrum. The RAN entity includes means for marking at least one of one or more packets by adding an indication associated with communication via the secondary cell, and means for transmitting the marked at least one of one or more packets to a core network.

In an aspect, the apparatus may be a RAN entity for a RAN that includes a primary cell utilizing the licensed spectrum and a secondary cell utilizing the unlicensed spectrum. The RAN entity includes a memory and at least one and at least one processor coupled to the memory. The at least one processor is configured to: mark at least one of one or more packets by adding an indication associated with communication via the secondary cell, and transmit the marked at least one of one or more packets to a core network.

In an aspect, a computer-readable medium storing computer executable code for wireless communication by a RAN entity for a RAN is provided, where the RAN includes a primary cell utilizing the licensed spectrum and a secondary cell utilizing the unlicensed spectrum. The computer-readable medium includes code to: mark at least one of one or more packets by adding an indication associated with communication via the secondary cell, and transmit the marked at least one of one or more packets to a core network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
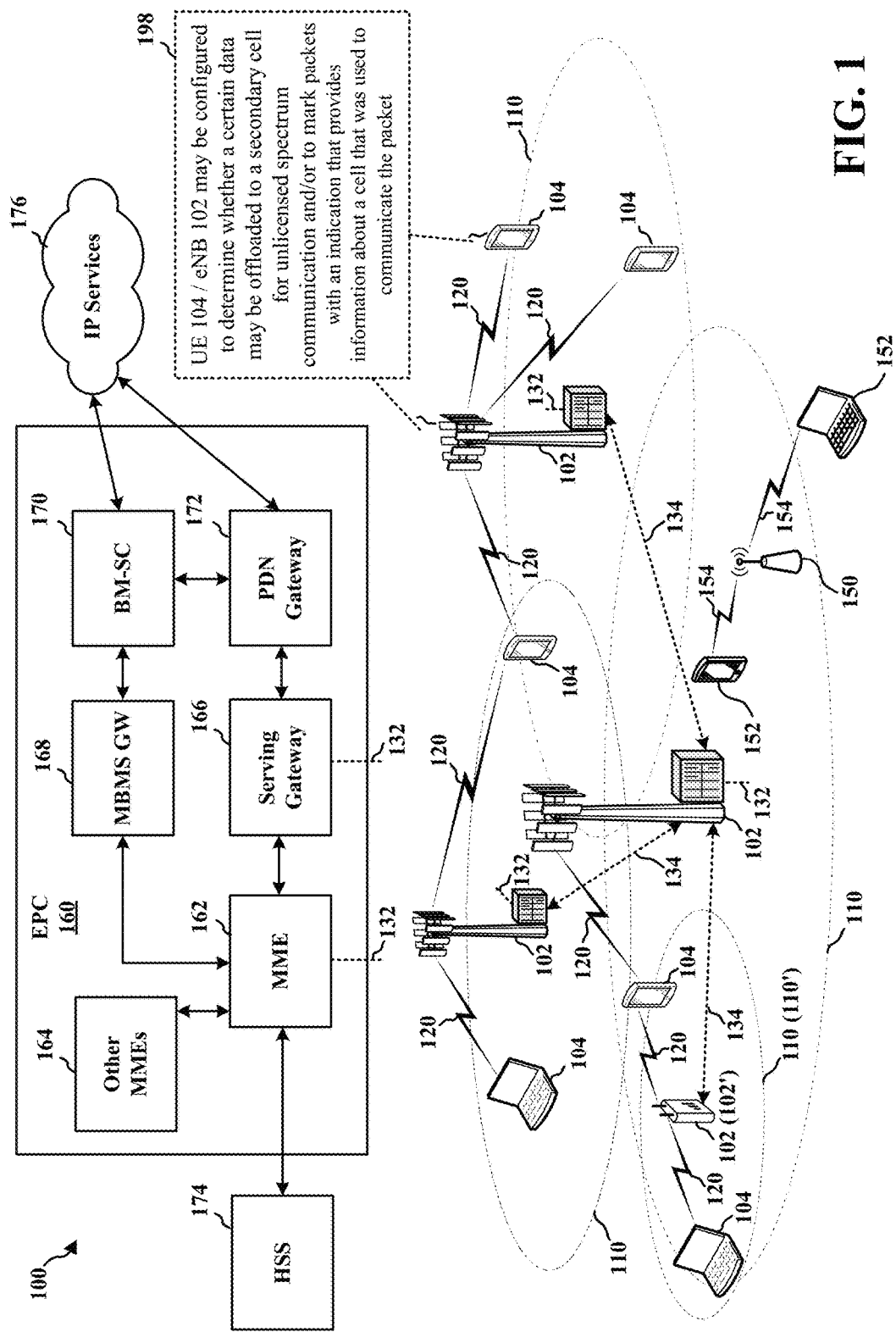
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to determine whether a certain data may be offloaded to a secondary cell for unlicensed spectrum communication and/or to mark packets with an indication that provides information about a cell that was used to communicate the packet (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
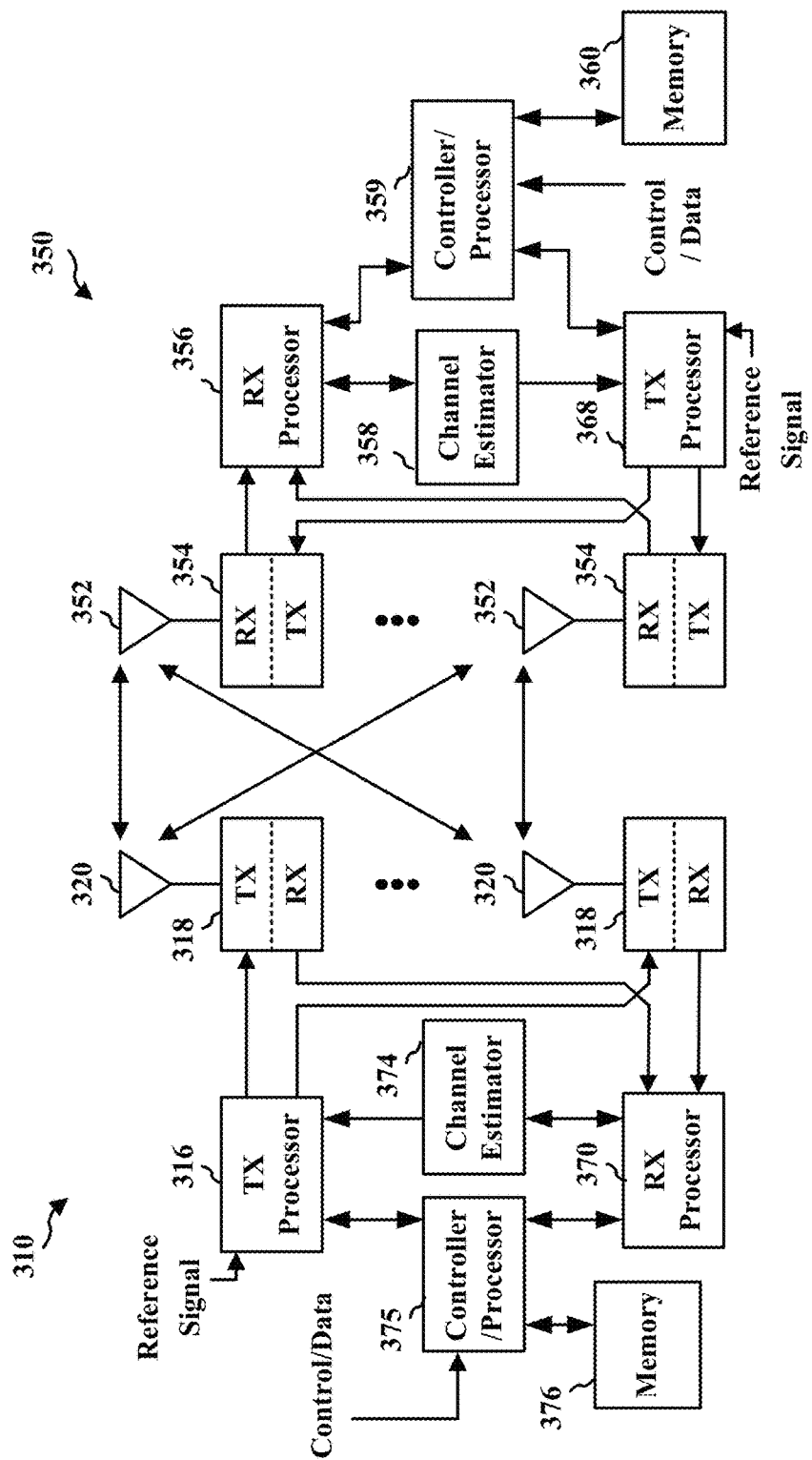
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A UE may be connected to both a primary cell providing a licensed access (e.g., in a licensed spectrum) and a secondary cell providing an unlicensed access (e.g., in an unlicensed spectrum). In particular, the UE may be connected to a primary cell providing communication over a licensed frequency band, e.g., an LTE frequency band, and a secondary cell providing communication over an unlicensed frequency band, e.g., a WiFi frequency band. For example, the UE may be connected to a RAN that includes the primary cell and the secondary cell. In one example, the RAN may include an eNB that supports LTE communication for the licensed access in the primary cell and unlicensed LTE (e.g., LTE-U) communication for the unlicensed access in the secondary cell. In another example, the RAN may include an eNB for cellular communication for the licensed access in the primary cell and a wireless local area network (WLAN) router for the unlicensed access in the secondary cell.

Figure 4:
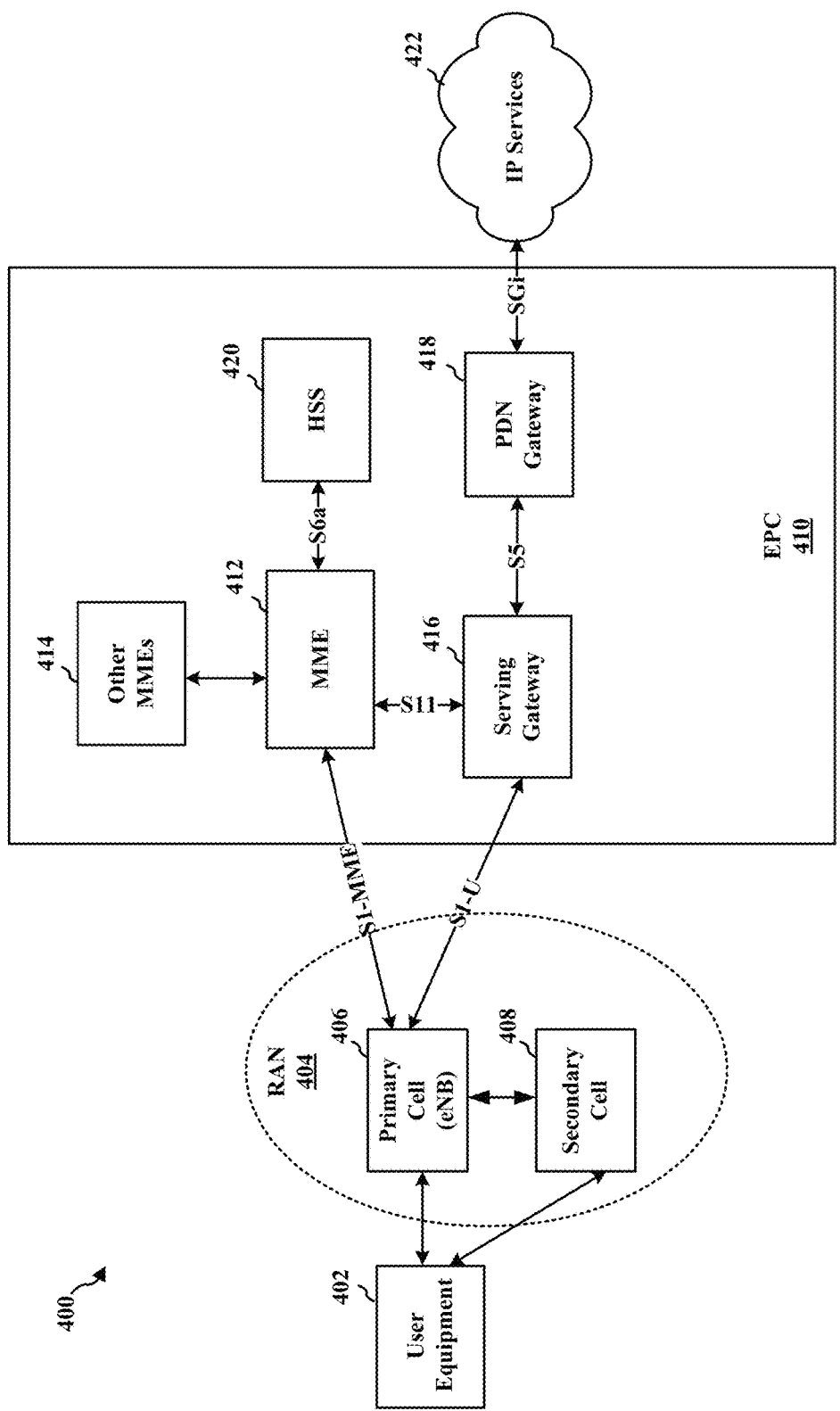
FIG. 4 is an example diagram illustrating a network architecture including a primary cell and a secondary cell.

FIG. 4 is an example diagram 400 illustrating a network architecture including a primary cell and a secondary cell. The UE 402 is connected to a RAN 404 including a primary cell 406 for licensed access and a secondary cell 408 for unlicensed access. In particular, the UE 402 may be connected to both the primary cell 406 and the secondary cell 408. The primary cell 406 communicates with the EPC (e.g., core network) 410 that includes an MME 412, other MMEs 414, a Serving Gateway (S-GW) 416, a PDN Gateway (P-GW) 418, and an HSS 420. In particular, the primary cell 406 communicates with the MME 412 via an S1-MME interface, and communicates with the serving gateway 416 via an S1-U interface. It is noted that the S1-MME interface provides an interface with a control plane, and the S1-U interface provides an interface with a user plane. The MME 412 communicates with the serving gateway 416 via an S11 interface, and the serving gateway 416 communicates with the PDN gateway 418 via an S5 interface. The MME 412 communicates with the HSS 420 via an S6a interface. The EPC 410 communicates with IP services 422. In particular, the PDN gateway 418 communicates with the IP services 422 via an SGi interface.

In the network architecture such as the architecture illustrated in FIG. 4, packets of a service data flow (SDF) in a bearer may be communicated over the primary cell and/or over the secondary cell, or some packets of the SDF may be carried over the primary cell while other packets of the SDF may be carried over the secondary cell. Each SDF may carry a different type of service. For example, one SDF may carry data associated with a streaming video, and another SDF may carry data associated with voice-over-IP calling. The UE 402 may receive multiple SDFs via the RAN 404. The eNB (e.g., the eNB serving the primary cell) may decide which packets are communicated over the primary cell and which packets are communicated over the secondary cell. The decision on whether the packets are sent via the primary cell or the secondary cell may depend on several factors, such as load conditions, radio conditions, local policies, visited network policies, etc., of the primary cell and the secondary cell. The eNB that serves the primary cell may determine which packets are to be carried over the primary cell and which packets are to be carried over the secondary cell. The eNB (e.g., the eNB serving the primary cell) may also decide how to communicate some data packets through the secondary cell based on (e.g., based on an algorithm).

The core network generally performs traffic policing and traffic charging in such a way that an operator (e.g., the UE) can differentiate when data packets are communicated over the primary cell and when data packets are communicated over the secondary cell. In particular, the traffic policing is related to providing authorization about which data traffic (e.g., packets of an SDF) is allowed to be communicated as well as conditions in which the data traffic is allowed to be communicated. The traffic charging includes generating charging information so that the core network can charge the operator based on an amount of data traffic transmitted and how the data traffic is routed. It is noted that, when the operator utilizes a secondary cell with unlicensed access, the operator may be charged differently from a case where the operator utilizes a primary cell with licensed access (e.g., due to the difference in operator policy or regulatory requirements).

When the core network performs a charging function, the core network may consider various factors including an air interface (data plane) offload using secondary cell to transport data traffic over the secondary cell, a core network offload at the local network at the secondary cell, and a control plane signaling that is communicated over LTE to provide the UE service using the secondary cell. Further, one or more charging models such as volume charging and time charging may be utilized. In particular, according to the volume charging, the operator may be charged (e.g., by the core network) based on an amount of data (e.g., a number of packets) transmitted over the primary cell and an amount of data transmitted over the secondary cell, for each of uplink communication and downlink communication. According to the time charging, the operator is charged (e.g., by the core network) based on a duration of connectivity over the primary cell and a duration of connectivity over the secondary cell. In an aspect, the operator may be charged for duration of connectivity over the primary cell for licensed access, and may not be charged for duration of connectivity over the secondary cell for unlicensed access. Thus, for example, the operator may not be charged for a duration of connectivity when connectivity over the secondary cell exists and there is no connectivity over the primary cell, but may be charged for a duration of connectivity when there is connectivity over the primary cell. Thus, when the core network performs the charging function, the core network needs to distinguish data traffic over the primary cell from data traffic over the secondary cell. For purposes of illustration but not limitation, the primary cell described herein operates in a licensed spectrum and the secondary cell described herein operates in an unlicensed spectrum.

The core network may perform a policing function to manage how the core network determines which traffic is transported over what type of cell (whether the primary cell or the secondary cell). The policing may be, for example, based on traffic characteristics. The following factors may need to be considered with respect to the policing function. According to one factor, by considering cell-characteristic specific rules, the core network should be able to manage how the eNB provides access via the primary cell and the secondary cell to the UE, based on the cell characteristics of each cell. For example, the core network may determine a percentage (e.g., a maximum cap or a minimum cap) of data bytes to be communicated over each cell and/or may determine a percentage (e.g., a maximum cap or a minimum cap) of data bytes to be communicated in downlink and/or to be communicated in uplink, for each cell. According to another factor, the core network should be able to enforce different policies for specific devices depending on whether a cell with a certain cell characteristic (e.g. unlicensed spectrum) is available or not. For example, if a maximum cap for data over the licensed spectrum is reached, the P-GW may decide whether to deactivate the bearer or to block subsequent data traffic (e.g., UL/DL traffic), depending on whether the UE is connected to a secondary cell providing unlicensed access (e.g., LTE-U or aggregation over WLAN). If the secondary cell is available and the maximum cap over the licensed spectrum is reached, P-GW may instruct (e.g., based on a policy) that all subsequent data traffic should be scheduled over the secondary cell in the unlicensed spectrum. Thus, the P-GW may need to receive information as to whether communication over the unlicensed spectrum is available or not, in order to enforce policy rules accordingly. According to another factor, the core network (e.g., a policy and charging rule function (PCRF)) should provide policies based on whether a cell with a certain cell characteristic (e.g. unlicensed spectrum) is available for the device.

The S1-U interface may not contain separate explicit tunnels for data to be communicated over the primary cell and for data to be communicated over the secondary cell. Thus, a tunnel provided by the S1-U may not distinguish whether the data is communicated over the primary cell or the secondary cell. Further, charging data records (CDRs) may be created in the core network elements (S-GW/P-GW) (e.g., not in the RAN). The eNB may generate some information to help the core network create CDRs. The CDRs may be used to charge the user of the UE for an amount of data traffic communicated. Because the CDRs may not be created in the RAN, the RAN may not be able to provide information about whether the communication is related to using the primary cell or using the secondary cell. Because the core network currently does not know which data is communicated over the primary cell or the secondary cell, the core network may not be able to perform charging correctly. CDR containers may be opened or closed when the UE's user location information (ULI) changes. For example, when a location of the UE changes and thus the ULI changes, the UE opens or closes the CDR containers based on whether the UE is operating over a licensed spectrum or over an unlicensed spectrum. If the UE is operating over the unlicensed spectrum, the UE closes the CDR containers to avoid incurring charging, and when the UE is in LTE, the UE opens the CDR containers to start charging.

The Aggregate Maximum Bit Rate (AMBR) of the UE may be considered for communication over the primary cell and/or the secondary cell. The AMBR is a per-UE value that is provided by the core network to the RAN (e.g., to the eNB), such that the eNB may use the AMBR to enforce the total maximum bit rate for all non-guaranteed-bit-rate (non-GBR) bearers. For example, the MME may transmit the UE-AMBR for each radio access technology (RAT) in E-UTRAN radio access bearer (E-RAB) messages. The core network may provide one AMBR value for either the primary cell or the secondary cell, instead of providing two separate AMBR values, one AMBR value for the communication over the primary cell and one AMBR value for the communication over the secondary cell. Because charging may be performed differently for different types of cells (e.g., based on charging requirements), a mechanism is needed to differentiate the AMBR values for primary cells and secondary cells. For example, if one cell operates differently from another cell, the core network should provide different AMBR values for the two different types of cells. In addition, the UE may utilize DL communication in one RAT (e.g., the secondary cell) and UL communication in another RAT (e.g. the primary cell). In such a case, a mechanism is needed to provide separate AMBR values for UL communication and for DL communication. For example, DL communication may be used in the secondary cell to receive main data, and UL communication may be used in the primary cell to transmit control signals to the core network. It is noted that the AMBRs may be included in mandatory fields in the INITIAL CONTEXT SETUP REQUEST message and may be optional in an E-RAB SETUP REQUEST, an E-RAB MODIFY REQUEST, or an E-RAB RELEASE COMMAND.

Some issues associated with charging may be addressed by having the eNB perform separate accounting and reporting of a data volume transmitted over the primary cell and a data volume transmitted over the secondary cell (e.g., by counting a number of packets communicated over the primary cell, and a number of packets communicated over the secondary cell). The reporting may be performed using the control plane or the user plane. In one approach using the control plane, the eNB provides the accounting information of the number of packets via the MME to the Serving Gateway and then the Serving Gateway forwards the accounting information to the PDN Gateway A Serving Gateway CDR and a PDN Gateway CDR may be extended to include explicit account information for data volumes over the primary cell and the secondary cell. In another approach using the control plane, the eNB provides the accounting information to the Serving Gateway directly over the S1-U interface via a separate general packet radio service (GPRS) tunneling protocol for the control plane (GTP-C) messages and then the Serving Gateway forwards the accounting information to the PDN Gateway, with a Serving Gateway CDR and a PDN Gateway CDR extended to include explicit account information for data volumes over the primary cell and the secondary cell. In yet another approach using the control plane, the eNB reports data volumes in the primary cell and/or the secondary cell directly to a Charging Gateway Function (CGF) using an eNB CDR or directly to a Charging Data Function (CDF) if an eNB CDR is not included in the eNB. The CGF or some other billing entity may correlate a Serving Gateway CDR, a PDN Gateway CDR and an eNB CDR (e.g., to provide consistency in charging). Further, in one approach using the user plane, the eNB may provide the accounting information to the Serving Gateway directly over the S1-U interface (e.g., in the GPRS tunneling protocol for the user plane (GTP-U) tunnel as a part of new header extensions for the bearer or in separate GTP-C messages).

If charging per data flow (e.g., per SDF) is performed at the PDN Gateway, the eNB should perform accounting of the data volume per data flow. However, the eNB may be unaware of the data flows. Therefore, the eNB may be made aware of the data flows, either via direct configuration when a bearer is set up or via user plane packet marking performed at the PDN Gateway. The PDN Gateway may mark the packets by including a certain identifier of the traffic flow in each packet header.

In particular, it may be desirable for the core network (e.g., Home Public Land Mobile Network (HPLMN)) to retain control of whether data traffic of a certain device can be offloaded to the secondary cell (e.g., from the primary cell). It may also be desirable for the core network to retain control of the type of data traffic and/or what amount of data traffic can be offloaded to the secondary cell. Thus, according to the disclosure, instead of relying on the eNB for decisions for authorization and accounting, the core network may be configured to make decisions on the authorization and accounting. The core network may be configured to determine whether data traffic of a certain device can be offloaded to the secondary cell (e.g., from the primary cell). To implement such authorization and accounting decisions, the core network should be able to indicate to the RAN whether specific data traffic can be offloaded to the secondary cell (or whether aggregation of the data traffic is allowed). According to a first approach of the disclosure, the core network is configured to make decisions of authorization for data flow and/or data traffic for a primary cell and for a secondary cell, and such decision of authorization is passed to a PDN Gateway. The core network may make the decision of authorization using a policy control and charging (PCC) function. The MME may modify the decision of authorization and/or may add additional policies (e.g., for authorization and/or accounting), based on a UE subscription profile. The decision of authorization may be combined with OAM information (e.g., because OAM information may provide real time conditions in the network, such as congestion, load emptying, etc.). The first approach of the disclosure may consider at least one of a Quality of Service (QoS) class indicator, PCC originated information, P-GW-originated information, MME originated information, or OAM-originated information.

According to a first aspect of the first approach, a new QoS class identifier (QCI) may be introduced for data flows communicated over the unlicensed spectrum (unlicensed access data flows). When an SDF is created in the core network, the core network assigns a QCI to the SDF to indicate what quality of service should be provided for the SDF. In addition to a QCI that is conventionally used, the first aspect of the first approach defines a new QCI value that a core network can assign to an SDF if the SDF is allowed/requested to be offloaded to the secondary cell. Thus, the core network assigns the new QCI value to the SDF and/or data traffic that the core network authorizes for offloading to the secondary cell. Based on the new QCI value, the RAN (e.g. eNB) determines which data traffic may be offloaded to a secondary cell.

Several options may be available to implement the first aspect of the first approach to utilize the new QCI. According to a first option of the first aspect of the first approach, the core network assigns, as a new QCI, a separate QCI called an unlicensed access QCI to an SDF, in order to indicate that the core network authorizes the data flow to be offloaded to a secondary cell (e.g., where the separate QCI is distinct from a conventional QCI). For example, if the RAN detects the unlicensed access QCI assigned to the SDF, the RAN may determine to offload the SDF to the secondary cell. On the other hand, if the RAN detects a (conventional) QCI assigned to the SDF, the RAN may determine not to offload the SDF to the secondary cell. Referring back to FIG. 4, for example, the EPC 410 may transmit the conventional QCI and/or the unlicensed access QCI to the RAN 404 (e.g., to the eNB for the primary cell 406), and the RAN 404 may subsequently determine whether to offload the SDF to the secondary cell 408 based on whether the unlicensed QCI is received or the conventional QCI is received for the SDF. The unlicensed access QCI may specify whether offloading to the SDF applies to UL communication, DL communication or both UL and DL communication for the SDF. In one aspect, the eNB (e.g., eNB for the primary cell 406) determines based on the unlicensed access QCI that the SDF is authorized to be offloaded to the secondary cell (e.g., secondary cell 408), and determines whether to offload the SDF to the secondary cell. According to another aspect, the unlicensed access QCI indicates that the core network (e.g., EPC 410) requests the data flow to be offloaded to the secondary cell (e.g., secondary cell 408) whenever secondary cell is available. In such an aspect, the eNB offloads SDFs with the unlicensed access QCI every time a secondary cell is available and radio conditions allow such offloading.

According to a second option of the first aspect of the first approach, instead of implementing a separate unlicensed access QCI, a (conventional) QCI is augmented to include a new QCI value indicating offloadability to the secondary cell. Thus, when the core network authorizes for offloading a particular SDF to the secondary cell, the core network may assign a new QCI value to the particular SDF and include the new QCI value in the QCI to indicate offloadability to the secondary cell. Referring back to FIG. 4, for example, the EPC 410 may include the new QCI value in the QCI to indicate offloadability to the secondary cell 408, and transmit the QCI including the new QCI value to the RAN 404 (e.g., to the eNB for the primary cell 406). The new QCI value in the QCI may specify whether offloading to the SDF applies to UL communication, DL communication or both UL and DL communication for the SDF. In one aspect, the new QCI value may indicate that the eNB (e.g., eNB for the primary cell 406) may offload the SDF to the secondary cell (e.g., secondary cell 408). In another aspect, the new QCI value may indicate that the eNB (e.g., eNB for the primary cell 406) should offload the SDF to the secondary cell (e.g., secondary cell 408) whenever the secondary cell is available. In an aspect, the core network may assign the new QCI to different data flows based on whether the core network allows the data flows to be offloaded/aggregated over the secondary cell or not.

According to a second aspect of the first approach, the core network provides an explicit indication of authorization for offloading (offloadability) to the secondary cell via the PCC and/or PDN Gateway. The PCC functionality may include a PCRF and a policy and charging enforcement function (PCEF). If the secondary cell is supported in the serving network, the PCRF (visited-PCRF if roaming) provides an indicator via a Gx interface to the PCEF to indicate for each flow whether the secondary cell (for the unlicensed access) may be or should be (e.g., is requested to be) used. For example, the PCRF provides the indicator to indicate that the data traffic is allowed for offloading or the traffic is requested to be offloaded. The PCRF creates and sends an Application Detection and Control (ADC) rule for a specific differentiated service code point (DSCP) indicating the unlicensed access. After receiving the indicator information, the PCEF in the PDN Gateway marks the bearer(s) with an indication that the data traffic may be offloaded or should be offloaded to the secondary cell for unlicensed access. The PCEF may mark each bearer with a new indication. The marking may be provided as a part of new evolved packet system (EPS) bearer QoS information. The marking may be carried all the way to the eNB. The eNB may use the information in the marking to determine whether certain data traffic may be offloaded or should be offloaded.

Figure 5:
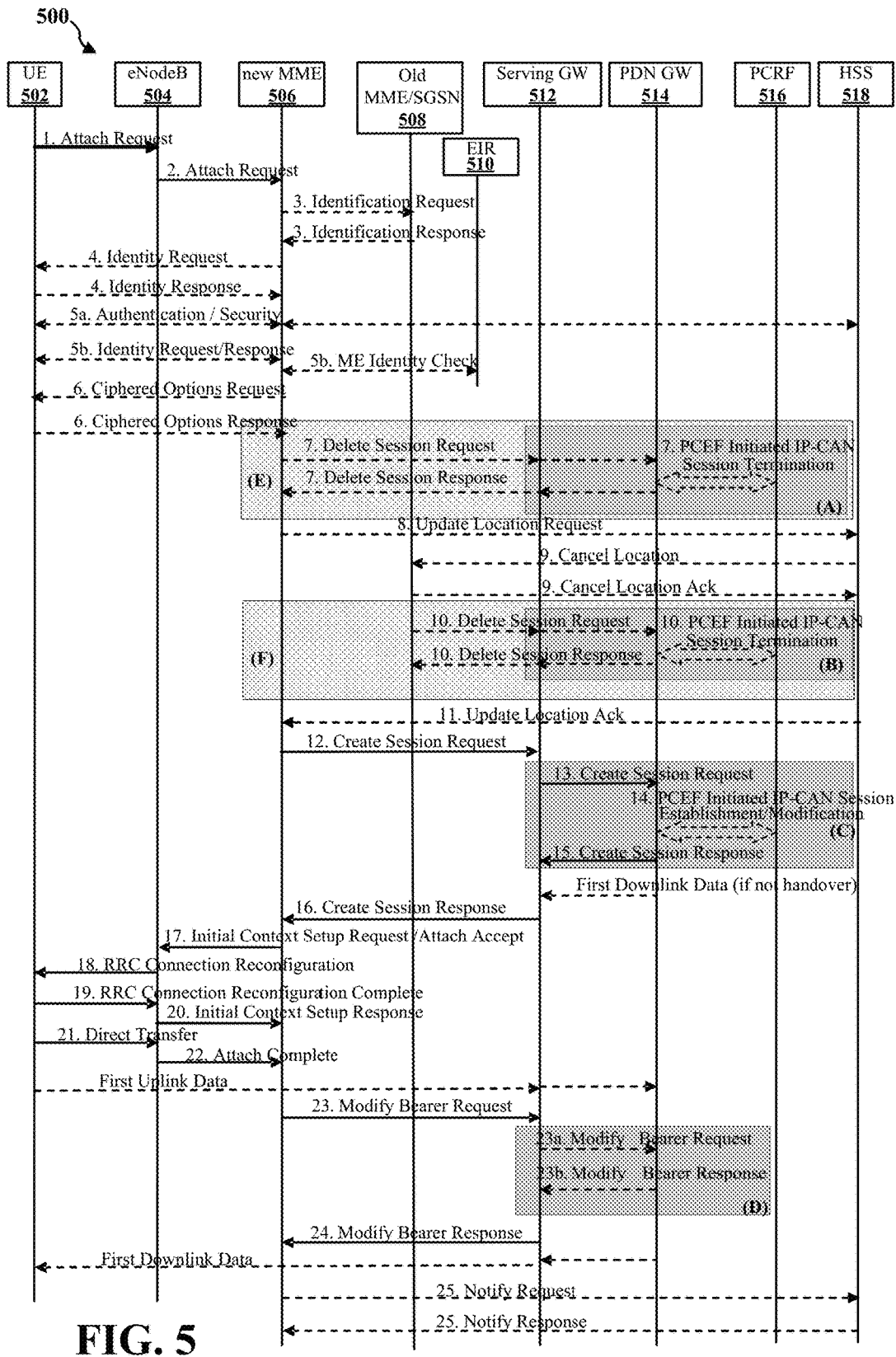
FIG. 5 is an example diagram illustrating an attach procedure according to an aspect of the disclosure.

FIG. 5 is an example diagram 500 illustrating an attach procedure according to the second aspect of the first approach of the disclosure. Initially, a UE registers with the core network to receive services that require registration via an attach procedure. The example diagram 500 shows interactions among the UE 502, an eNB 504, a new MME 506, an old MME/SGSN 508, an equipment identity register (EIR) 510, an S-GW 512, a P-GW 514, a PCRF 516, and an HSS 518. At operation 1, the UE 502 sends an attach request to the eNB 504, which forwards the attach request (operation 2) to a new MME 506. In response, at operation 3, the new MME 506 sends the identification request to the old MME/SGSN 508, which returns an identification response back to the new MME 506. If the UE 502 is unknown in both the old MME/SGSN 508 and new MME 506, the new MME 506 sends an identity request to the UE 502, which returns an identity response to the new MME 506 (operation 4). At operation 5a, authentication and security setup is performed between the UE 502 and the new MME 506 as well as between the new MME 506 and the HSS 518. At operation 5b, the new MME 506 retrieves a mobile equipment (ME) identity from the UE 502 via the identity request/response procedure, and the new MME 506 subsequently checks the ME identity with the EIR 510 to decide whether to continue with the attach procedure. At operation 6, the UE 502 retrieves the ciphered options from the new MME 506 by the ciphered options request/response procedure.

At operation 7, if there are active bearer contexts in the new MME 506 for the UE 502, the new MME 506 deletes these active bearer contexts by sending a Delete Session Request to the S-GW 512 and the P-GW 514, which acknowledge with a Delete Session Response, and the PCEF in the P-GW 514 performs an IP connectivity access network (IP-CAN) Session Termination procedure with the PCRF 516 to indicate that resources have been released.

At operation 8, the new MME 506 may transmit an Update Location Request to the HSS 518. At operation 9, the HSS sends a Cancel Location message to the old MME/SGSN 508, which acknowledges with a Cancel Location Ack message and removes bearer contexts. At operation 10, if there are active bearer contexts in the old MME/SGSN 508 for the UE 502, the old MME/SGSN 508 deletes these active bearer contexts by sending a Delete Session Request to the S-GW 512 and the P-GW 514, which acknowledge with a Delete Session Response, and the PCEF in the P-GW 514 performs an IP-CAN Session Termination procedure with the PCRF 516 to indicate that resources have been released. At operation 11, the HSS 518 may acknowledge the Update Location Request by sending an Update Location Ack message to the new MME 506.

At operation 12, the new MME 506 selects the S-GW 512 and sends a Create Session Request to the S-GW 512. At operation 13, the S-GW 512 forwards the Create Session Request to the P-GW 514. At operation 14, the P-GW 514 performs an IP-CAN Session Establishment procedure, and thereby obtains default PCC rules for the UE 502. At operation 14, during the IP-CAN Session Establishment/Modification, the PCRF 516 sends to the P-GW 514 an ADC rule for a specific DSCP indicating unlicensed access. At operation 15, the P-GW 514 returns a Create Session Response to the S-GW 512, and the first downlink data may be communicated from the P-GW 514 to the S-GW 512. The P-GW 514 may authorize offloadability to the secondary cell for the bearer, and include an indication of offloadability in the Create Session Request sent to the S-GW 512 at operation 15. At operation 16, the Create Session Response is forwarded to the new MME 506. The S-GW 512 may forward the indication of offloadability via the Create Session Request sent to the new MME 506 at operation 16. At operation 17, the new MME 506 sends an Initial Context Setup Request to the eNB 504. The new MME 506 may send the indication of offloadability to the eNB 504 via the Initial Context Setup Request sent to the eNB 504, at operation 17.

At operation 18, the eNB 504 sends an RRC Connection Reconfiguration message including the EPS Radio Bearer Identity to the UE 502, and the Attach Accept message will be sent along to the UE 502. At operation 19, the UE 502 sends an RRC Connection Reconfiguration Complete message to the eNB 504. At operation 20, the eNB 504 sends the Initial Context Response message to the new MME 506. At operation 21, The UE 502 sends a Direct Transfer message to the eNB 504, which includes an Attach Complete message. At operation 22, the eNB 504 forwards the Attach Complete message to the new MME 506 in an Uplink NAS Transport message, and then the first UL data may be communicated to the P-GW 514 via S-GW 512.

At operation 23, upon reception of both, the Initial Context Response message in operation 20 and the Attach Complete message in operation 22, the new MME sends a Modify Bearer Request message to the S-GW 512. At operation 23a, if a Handover Indication is included in operation 23, the S-GW 512 sends a Modify Bearer Request message to the P-GW 514 to prompt the P-GW 514 to tunnel packets from a non 3GPP IP access system to a 3GPP access system and immediately start routing packets to the S-GW 512. At operation 23b, The P-GW 514 acknowledges by sending Modify Bearer Response to the S-GW 512. At operation 24, the S-GW 512 acknowledges by sending Modify Bearer Response message to the new MME 506. Then, the UE 502 may receive the first DL data from the P-GW 514 via the S-GW 512. At operation 25, the new MME 506 sends a Notify Request including the APN and P-GW 514 identity to the HSS 518 for mobility with non-3GPP accesses, and then receives from the HSS 518 a Notify Response.

Several different options are available for data scheduling according to the second aspect of the first approach. According to a first option for data scheduling according to the second aspect of the first approach, the P-GW may provide instructions/policies on scheduling the data over the secondary cell. The instructions may be provided per EPS bearer and/or per data flow. The instructions may be provided during default EPS bearer activation and/or dedicated EPS bearer activation and/or default/dedicated EPS bearer modification.

According to the first option for data scheduling, if the instructions/policies on scheduling the data over the secondary cell are provided during the default EPS bearer activation, the P-GW may receive cell-characteristic specific policies from the PCRF, where the policies apply to the primary cell and the secondary cell. The P-GW decides certain rules of cell-characteristic specific usage (cell-characteristic specific usage rules) based on the cell-characteristic specific policies, and forward these cell-characteristic specific usage rules to the eNB, (e.g., via the S-GW and the MME). The cell-characteristic specific usage rules may be defined for UL communication and DL communication separately. The cell-characteristic specific usage rules may include, for example, a desired percentage of a data amount (e.g., 50%) transmitted over the secondary cell (in the unlicensed spectrum) with respect to a data amount transmitted over the primary cell (in the licensed spectrum). The cell-characteristic specific usage rules may include a maximum data amount (e.g., in bytes) allowed to be communicated over the primary cell. Once the eNB receives the cell-characteristic specific usage rules, the eNB will then use these cell-characteristic specific usage rules to determine how the bearer is served. For example, if the bearer is not allowed for WLAN use, then the eNB may not initiate WLAN interworking for a corresponding UE when there are no WLAN-allowed bearers. Similarly if one or more bearers are allowed WLAN bearers, the eNB may initiate the WLAN interworking for the corresponding UE. An example use for the first option for data scheduling is illustrated in FIG. 6.

Figure 6:
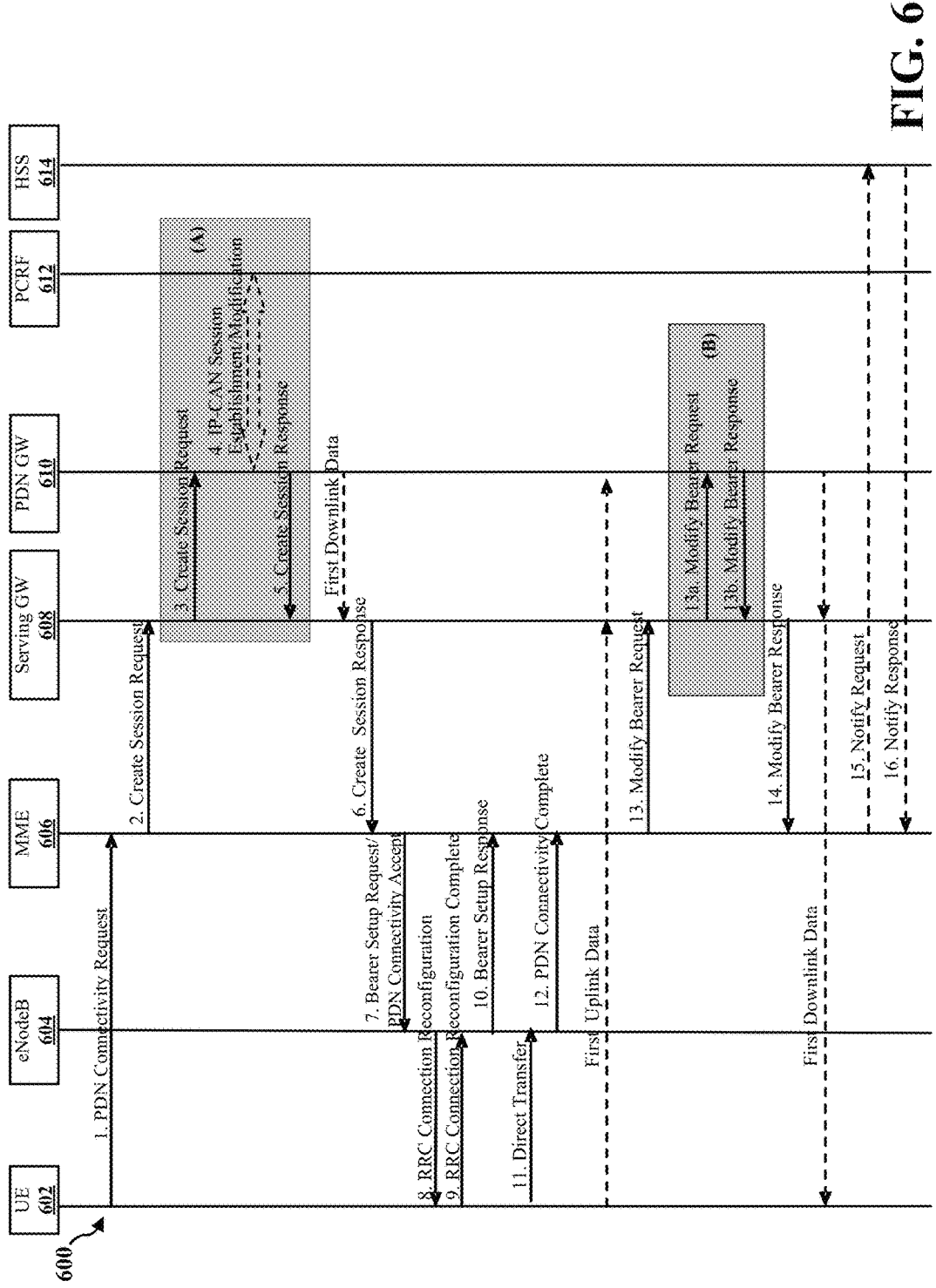
FIG. 6 is an example diagram illustrating a default EPS bearer activation procedure according to an aspect of the disclosure.

FIG. 6 is an example diagram 600 illustrating a default EPS bearer activation procedure according to an aspect of the disclosure. The example diagram 600 shows interactions among the UE 602, an eNB 604, an MME 606, an S-GW 608, a P-GW 610, a PCRF 612, and an HSS 614. A default bearer activation procedure may be activated by the UE 602 via a PDN Connectivity Request, which may be either standalone or included in an attach request message during an attach procedure. At operation 1, the UE 602 sends the PDN Connectivity Request to the MME 606. At operation 2, the MME 606 allocates a bearer identifier, and sends a Create Session Request to the S-GW 608. At operation 3, the S-GW 608 forwards the Create Session Request to the P-GW 610. At operation 4, the P-GW 610 performs IP-CAN Session Establishment/Modification with the PCRF 612. In particular, during the IP-CAN session establishment, the P-GW 610 may receive from the PCRF 612 cell-characteristic specific policies that are available for the default bearer. At operation 5, the P-GW 610 sends the Create Response to the S-GW 608, and then the first DL data may be sent from the P-GW 610 to the S-GW 608. In particular, at operation 5, the P-GW 610 decides cell-characteristic specific usage rules based on the cell-characteristic specific policies received from the PCRF 612, and includes the cell-characteristic specific usage rules in the Create Session Response to be sent to the S-GW 608. The P-GW 610 may include the cell-characteristic specific usage rules in a new information element for the cell-characteristic specific usage rules within the Create Session Response. At operation 6, the S-GW 608 forwards the Create Session Response to the MME 606. Thus, at operation 6, the S-GW 608 forwards the cell-characteristic specific usage rules within the Create Session Response to the MME 606. At operation 7, the MME 606 forwards the cell-characteristic specific usage rules to the eNB 604 via a Bearer Setup Request message, and may also forward a PDN Connectivity Accept message to the eNB 604. It is noted that the subsequent operations including operations 8-16 may be performed according to the cell-characteristic specific usage rules.

At operation 8, the eNB 604 sends an RRC Connection Reconfiguration to the UE 602, where the RRC Connection Reconfiguration may include the PDN Connectivity Accept message, and at operation 9, the UE 602 sends the RRC Connection Reconfiguration Complete to the eNB 604. At operation 10, the eNB 604 sends a Bearer Setup Response to the MME 606. At operation 11, the UE 602 builds a PDN Connectivity Complete message including an EPS Bearer Identity, and then sends a Direct Transfer (PDN Connectivity Complete) message to the eNB 604. At operation 12, the eNB 604 sends an Uplink NAS Transport (PDN Connectivity Complete) message to the MME 606. Subsequently, when the UE obtains a PDN Address Information, the UE may send UL data to the eNB 604. The UP data is then tunneled to the S-GW 608 and P-GW 610.

At operation 13, when receiving the Bearer Setup Response message (e.g., in operation 10) and the PDN Connectivity Complete message (e.g., in operation 12), the MME 606 sends a Modify Bearer Request to the S-GW 608. At operation 13a, if a Handover Indication is included in operation 13, the S-GW 608 sends a Modify Bearer Request to the P-GW 610 to prompt the P-GW 610 to tunnel packets from a non-3GPP IP access system to a 3GPP access system and to start routing packets to the S-GW 608 for default EPS bearers and any dedicated EPS bearers established. At operation 13b, the P-GW 610 acknowledges by sending a Modify Bearer Response to the S-GW 608. At operation 14, the S-GW 608 acknowledges by sending a Modify Bearer Response to the MME 606. Then, the UE 602 may receive DL data from the P-GW 610 via the S-GW 608. After the MME 606 receives Modify Bearer Response in operation 14 and certain conditions are satisfied, the MME 606 at operation 15 sends a Notify Request including the P-GW address and the APN to the HSS 614 for mobility with non-3GPP accesses. At operation 16, the HSS 614 stores the P-GW identity and the associated APN, and sends a Notify Response to the MME 606.

Figure 7:
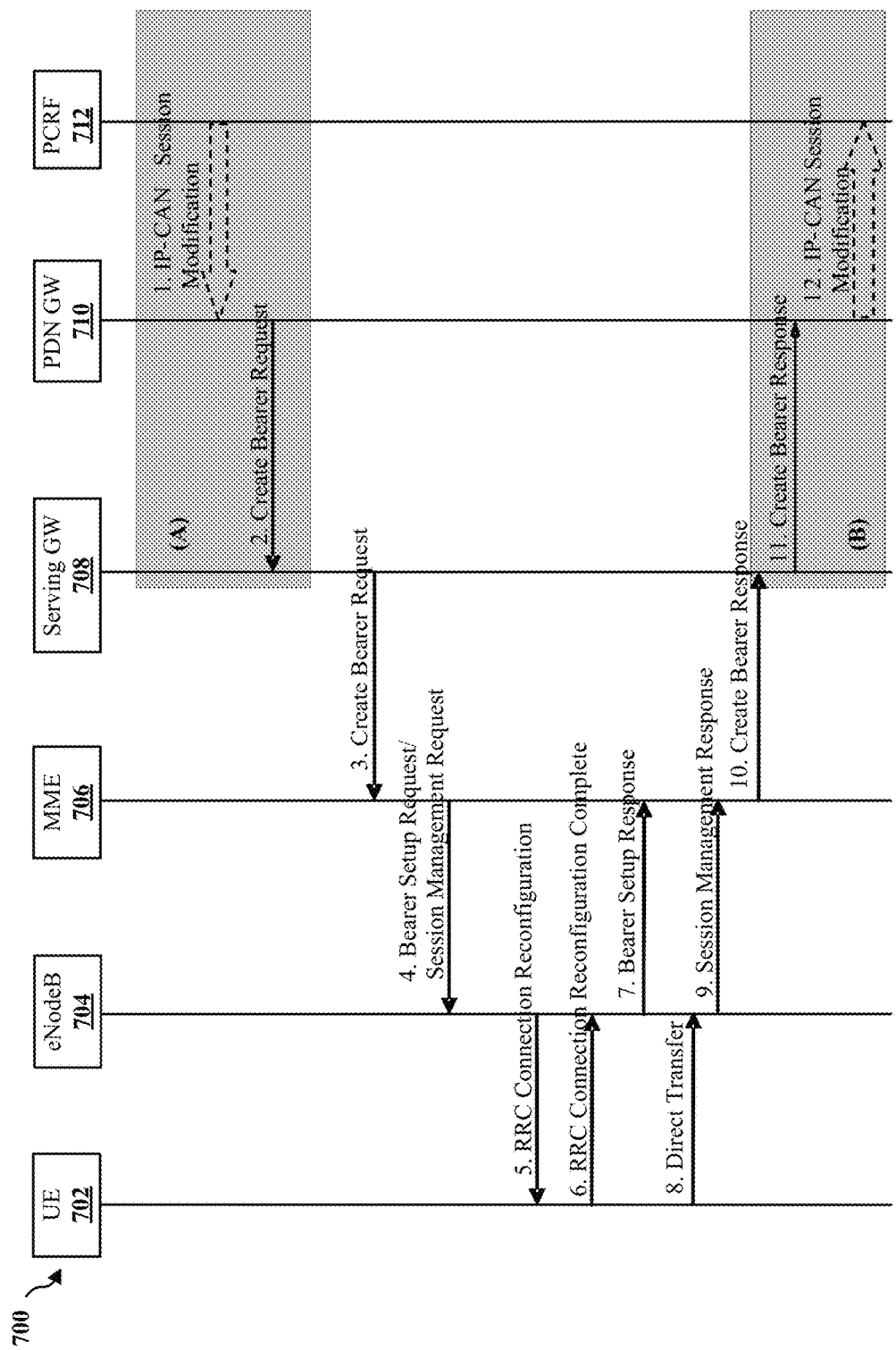
FIG. 7 is an example diagram illustrating a dedicated EPS bearer activation procedure according to an aspect of the disclosure.

According to a second option for data scheduling, the instructions may be provided during the dedicated EPS bearer activation, as illustrated in FIG. 7, for example. FIG. 7 is an example diagram 700 illustrating a dedicated EPS bearer activation procedure according to an aspect of the disclosure. The example diagram 700 shows interactions among the UE 702, an eNB 704, an MME 706, an S-GW 708, a P-GW 710, and a PCRF 712. At operation 1, during IP-CAN Session Modification, the PCRF 712 provides cell-characteristic specific policies for the dedicated bearer to the P-GW 710. At operation 2, the P-GW 710 sends the Create Response to the S-GW 708. In particular, at operation 2, the P-GW 710 decides cell-characteristic specific usage rules based on the cell-characteristic specific policies received from the PCRF 712, and includes the cell-characteristic specific usage rules in the Create Session Response to be sent to the S-GW 708. The P-GW 710 may include the cell-characteristic specific usage rules in a new information element for the cell-characteristic specific usage rules within the Create Session Response. At operation 3, the S-GW 708 forwards the Create Session Response to the MME 706. Thus, at operation 3, the S-GW 708 forwards the cell-characteristic specific usage rules within the Create Session Response to the MME 706. At operation 4, the MME 706 forwards the cell-characteristic specific usage rules to the eNB 704 via a Bearer Setup Request message, and may forward a Session Management Request to the eNB 704. It is noted the subsequent operations including operations 5-12 may be performed according to the cell-characteristic specific usage rules.

At operation 5, the eNB 704 maps the EPS Bearer QoS to the Radio Bearer QoS, and then sends a RRC Connection Reconfiguration message to the UE 702, and at operation 6, the UE 702 UE acknowledges the radio bearer activation to the eNB 704 by sending a RRC Connection Reconfiguration Complete message to the eNB 704. At operation 7, the eNB 704 acknowledges the bearer activation to the MME 706 by sending a Bearer Setup Response message to the MME 706. At operation 8, the UE 702 builds a Session Management Response including EPS Bearer Identity, and then sends a Direct Transfer message (including the Session Management Response) to the eNB 704. At operation 9, the eNB 704 sends the Session Management Response to the MME 706. At operation 10, after receiving the Bearer Setup Response message (in operation 7) and the Session Management Response message (in operation 9), the MME 706 acknowledges the bearer activation to the S-GW 708 by sending a Create Bearer Response message to the S-GW 708. At operation 11, the S-GW 708 acknowledges the bearer activation to the P-GW 710 by sending a Create Bearer Response to the P-GW 710. At operation 12, the P-GW 710 performs the IP-CAN Modification procedure with the PCRF 712. For example, at operation 12, if the dedicated bearer activation procedure was triggered by a PCC Decision Provision message from the PCRF 712, the P-GW 710 indicates to the PCRF 712 whether the requested PCC decision (QoS policy) could be enforced or not, allowing the completion of the IP CAN Session Modification procedure.

According to a third option for data scheduling, the P-GW may provide instructions for data scheduling during the EPS bearer modification procedure. The core network may initiate EPS bearer modification procedure (e.g., with the RAN) due to change of policies or conditions regarding cell-characteristic specific usage. For example, if the UE reaches a maximum data amount of licensed spectrum usage (e.g., based on the user's data plan), the core network may initiate the EPS bearer modification procedure to indicate to eNB that unlicensed spectrum can be used and licensed spectrum should not be used. An example use for the third option for data scheduling is illustrated in FIG. 8.

Figure 8:
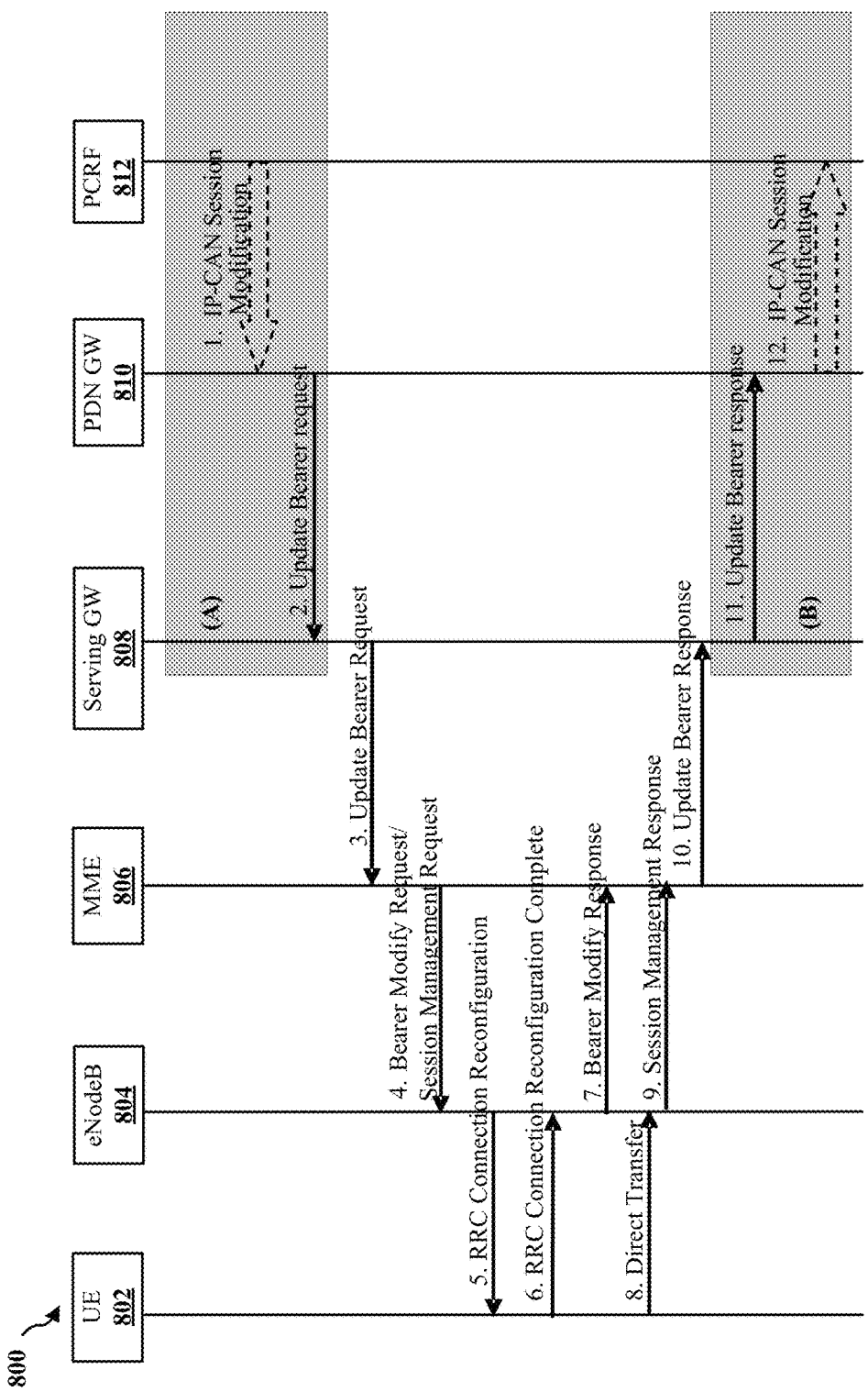
FIG. 8 is an example diagram illustrating an EPS bearer modification procedure according to an aspect of the disclosure.

FIG. 8 is an example diagram 800 illustrating an EPS bearer modification procedure according to an aspect of the disclosure. The example diagram 800 shows interactions among the UE 802, an eNB 804, an MME 806, an S-GW 808, a P-GW 810, and a PCRF 812. At operation 1, the PCRF 812 initiates the EPS bearer modification procedure by performing IP CAN Session Modification with the P-GW 810. For example, the PCRF 812 may send a PCC decision provision (QoS policy) message to the P-GW 810 as initial operations of the EPS bearer modification procedure. At operation 2, the P-GW 810 determines (e.g., based on the QoS policy) that the authorized QoS of a service data flow has changed or not, and then sends the Update Bearer Request to the S-GW 808. Thus, at operation 2, the P-GW 810 performs an initial portion of the bearer modification procedure, for example, to change the cell-characteristic specific usage rules (e.g., based on the QoS policy from the PCRF 812). At operation 2, after the cell-characteristic specific usage rules are changed, the P-GW 810 includes the cell-characteristic specific usage rules in the Update Bearer Request to S-GW 808. In an aspect, the P-GW 810 may also include, in the Update Bearer Request, an indication to the UE 802 about the change in the cell-characteristic specific usage rules. At operation 3, the S-GW 808 sends the Update Bearer Request to the MME 806, and thereby forwards the cell-characteristic specific usage rules to the MME 806. At operation 4, the MME 806 forwards the cell-characteristic specific usage rules to the eNB 804 via a Bearer Modify Request message. It is noted the subsequent operations including operations 5-12 may be performed according to the cell-characteristic specific usage rules.

At operation 5, the eNB 804 maps the modified EPS Bearer QoS to the Radio Bearer QoS, and then sends an RRC Connection Reconfiguration message to the UE 802, and at operation 6, the UE 802 UE acknowledges the radio bearer activation to the eNB 804 by sending a RRC Connection Reconfiguration Complete message to the eNB 804. At operation 7, the eNB 804 acknowledges the bearer modification to the MME 806 by sending a Bearer Modify Response message to the MME 806. At operation 8, the UE 802 builds a Session Management Response including EPS Bearer Identity, and then sends a Direct Transfer message to the eNB 804. At operation 9, the eNB 804 sends a Session Management Response message to the MME 806. At operation 10, after receiving the Bearer Modify Response message (in operation 7) and the Session Management Response message (in operation 9), the MME 806 acknowledges the bearer modification to the S-GW 808 by sending an Update Bearer Response message to the S-GW 808. At operation 11, the S-GW 808 acknowledges the bearer modification to the P-GW 810 by sending the Update Bearer Response to the P-GW 810. At operation 12, the P-GW 810 performs the IP-CAN Modification procedure with the PCRF 812. For example, at operation 12, if the bearer modification procedure was triggered by a PCC Decision Provision message from the PCRF 812, the P-GW 810 indicates to the PCRF 812 whether the requested PCC decision (QoS policy) could be enforced or not, allowing the completion of the IP CAN Session Modification procedure.

According to a third aspect of the first approach, the MME is configured to provide the cell-characteristic specific usage rules to the RAN as an explicit indication from the MME. As discussed above, the cell-characteristic specific usage rules may be applied per UE. The cell-characteristic specific usage rules may be based on subscription information received from the HSS and/or configuration information. The RAN may determine to combine the cell-characteristic specific usage rules. In more detail, according to the third aspect of the first approach, the MME provides the cell-characteristic specific usage rules during an S1-AP context setup between the MME and the eNB for every UE. The S1-AP context setup is performed between the MME and the eNB when the UE is establishing a new connection with the eNB. The S1-AP context setup may be performed during at least one of an attach procedure, a tracking area update procedure, a service request procedure, or a handover procedure (e.g., established between a target eNB and a target MME). The MME may provide the cell-characteristic specific usage rules in the Initial Context Setup request sent from the MME to the eNB. Additionally, the MME may initiate a UE Context Modification procedure to change the cell-characteristic specific rules, for example, if the UE is handed over to a new area where a different cell-characteristic specific rules apply.

Figure 9:
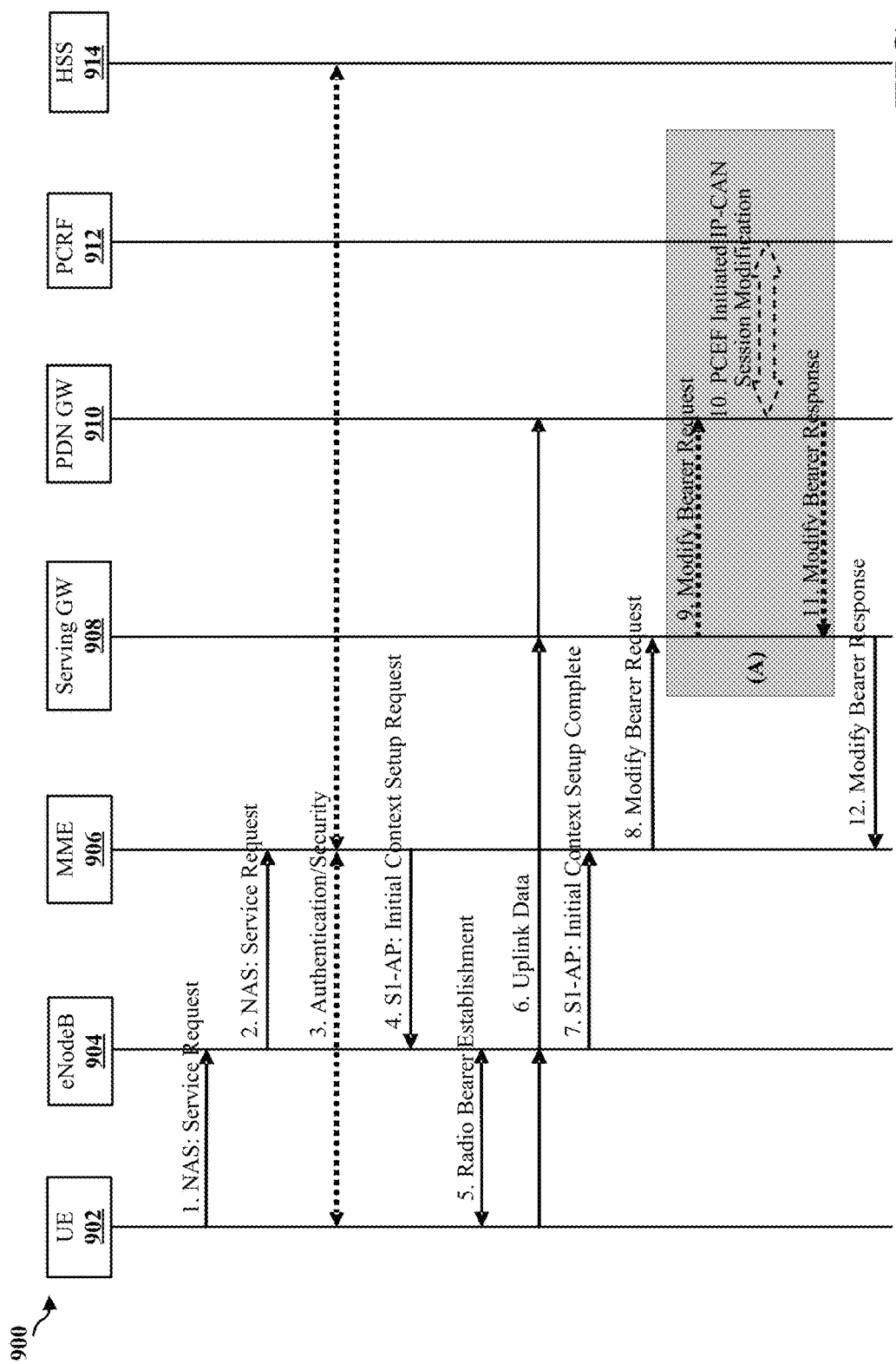
FIG. 9 is an example diagram illustrating a service request procedure according to an aspect of the disclosure.

FIG. 9 is an example diagram 900 illustrating a service request procedure according to the third aspect of the first approach of the disclosure. The example diagram 900 shows interactions among the UE 902, an eNB 904, an MME 906, an S-GW 908, a P-GW 910, a PCRF 912, and an HSS 914. At operation 1, the UE 902 sends a NAS message Service Request to the eNB 904, and at operation 2, the eNB 904 forwards the NAS message Service Request to the MME 906. The NAS message Service Request may be encapsulated in an S1-AP: Initial UE Message. At operation 3, authentication and security procedures are performed between the UE 902 and the MME 906, and the MME 906 and the HSS 914. At operation 4, the MME 906 sends an S1-AP Initial Context Setup Request to the eNB 904. In particular, at operation 4, the MME 906 provides the cell-characteristic specific rules in the S1-AP Initial Context Setup Request to the eNB 904.

At operation 5, the eNB 904 performs the radio bearer establishment procedure with the UE 902. At operation 6, the eNB 904 sends UL data to the S-GW 908, which forwards the UL data to the P-GW 910. At operation 7, the eNB 904 sends an S1-AP message Initial Context Setup Complete to the MME 906. At operation 8, the MME 906 sends a Modify Bearer Request to the S-GW 908. At operation 9, if a certain changes have occurred (e.g., in the RAT type or a UE location), the S-GW 908 sends a Modify Bearer Request to the P-GW 910. At operation 10, the P-GW 910 interacts with the PCRF 912 to get the PCC rules according to the RAT Type via a PCEF initiated IP CAN Session Modification procedure. At operation 11, The P-GW 910 sends a Modify Bearer Response to the S-GW 908.

According to a fourth aspect of the first approach, the RAN may be configured (e.g., by the core network) with the cell-characteristic specific usage rule via the OAM function. In particular, the eNB may be configured with the cell-characteristic specific usage rules at any point. It is noted that the RAN may determine to combine the cell-characteristic specific usage rules.

A second approach of the disclosure addresses issues related to accounting and charging. According to the disclosure, the charging (e.g., charging for data communicated) may be performed explicitly or implicitly. Explicit charging may be based on marking of packets transported over the secondary cell or marking of packets when the eNB does not need to perform any reporting of data volume transmitted over the primary cell and/or secondary cell. In an aspect, the RAN (e.g., the eNB) may provide explicit marking by marking packets with an indication that provides information as to whether the packet has been communicated over the primary cell in the licensed spectrum or over the secondary cell in the unlicensed spectrum. In particular, the RAN (e.g., the eNB) identifies which packets have been transported over licensed access or over unlicensed access, and marks such packets with the indication. The marking may be carried through the core network to create rules. The created rules may be a rule that packets in the DL would be communicated in the same way as the UL packet (whether over the primary cell or the secondary cell), or a rule that defines specific charging and accounting instructions for packets with this DSCP marking in UL and DL communication.

Figure 10:
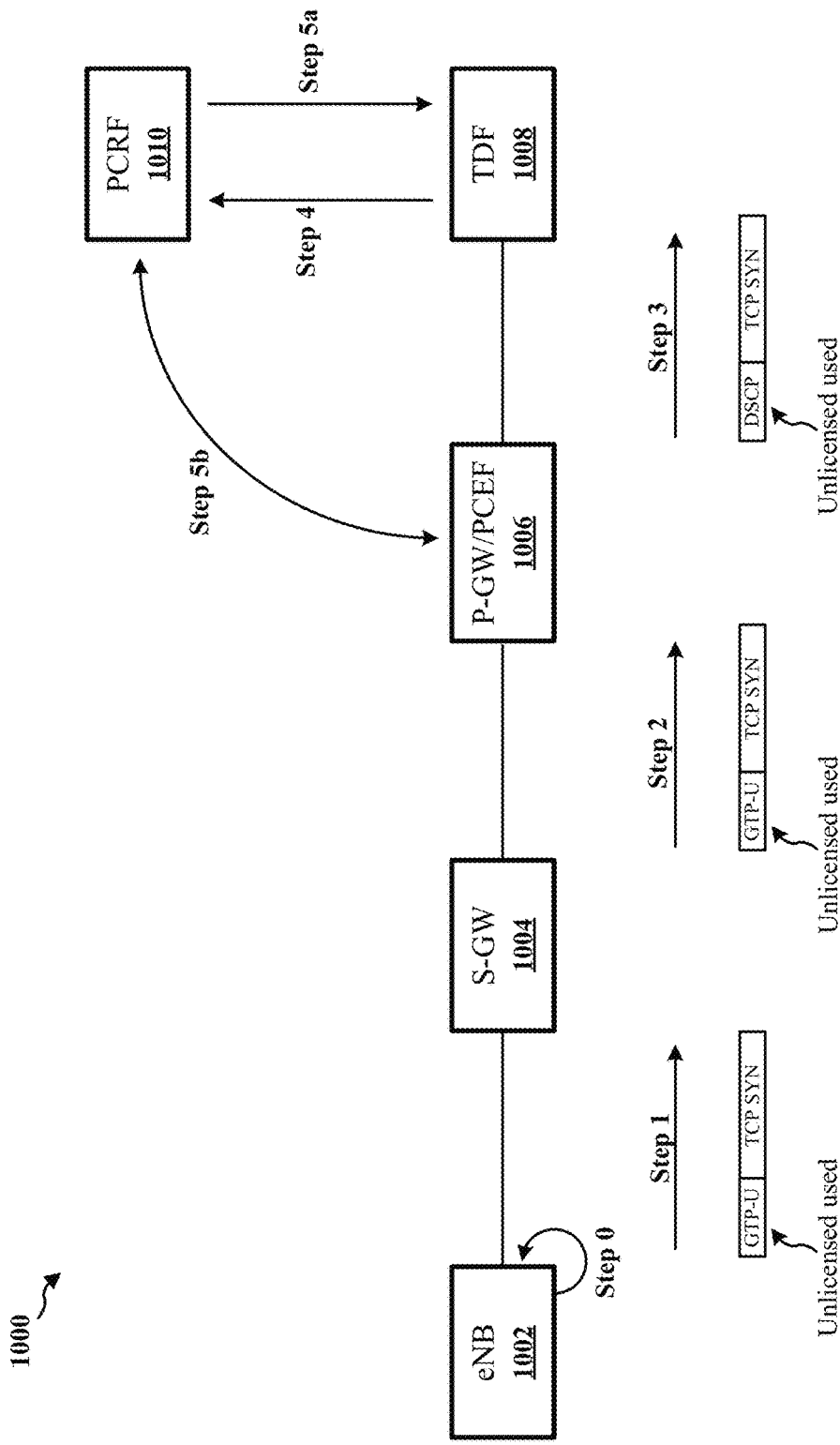
FIG. 10 is an example diagram illustrating the explicit marking according to the second approach of the disclosure.

FIG. 10 is an example diagram 1000 illustrating the explicit marking according to the second approach of the disclosure. The example diagram 1000 shows interactions among an eNB 1002, an S-GW 1004, a P-GW 1006, a traffic detection function (TDF) 1008, and a PCRF 1010. At operation 0 and operation 1, the eNB "marks" (e.g., over the S1-U interface) the GTP-U header of packets that have actually been transported over the secondary cell by adding a new indication (e.g. adding a new Information Element to the GTR-U header) to indicate that the packets have been communicated over the secondary cell. Thus, at operation 1, a packet with the marking in the GTP-U header is sent from the eNB 1002 to the S-GW 1004. At operation 2, the S-GW maintains the same GTP-U with the marking over the S5 interface and/or the S8 interface, and sends the packet with the same GTP-U marking to the P-GW 1006 that includes the PCEF. At operation 3, the P-GW 1006 marks the IP packet containing this GTP-U header with a differentiated services code point (DSCP) value. For example, a DSCP value that has not been used for specific meaning may be used to mark the IP packet, such as DSCP values in ranges reserved for experimental or local Use. Alternatively, a new DSCP value that has not been previously utilized may be defined to indicate the unlicensed access and to mark the IP packet. Further, at operation 3, the DSCP may transmit the marked IP packets to the TDF 1008. At operation 4, the TDF 1008 matches the detected UL traffic with a specific DSCP within an installed Application Detection and Control (ADC) rule and sends an event start message to PCRF 1010. In particular, the TDF 1008 may provide information about packets (whether the packets are communicated over the primary cell or the secondary cell) to the PCRF 1010. At operation 5a, the PCRF creates a new ADC rule that the TDF 1008 uses to mark packets in DL with the DSCP value, such that packets in the DL would be communicated in the same way as the UL packet (whether over the primary cell or the secondary cell), and provides the new ADC rule to the TDF 1008. At operation 5b, the PCRF creates a new PCC rule to define specific charging and accounting instructions for packets with this DSCP marking in UL and DL communication, and provides the new PCC rule to the P-GW 1006.

In an aspect, if any part of a packet has been carried over the secondary cell, then the whole packet is marked as being routed over the secondary cell. It is also noted that, this solution assumes that if data traffic for a bearer is being routed on UL over the secondary cell, then the data traffic for that bearer is considered routed over the secondary cell for accounting purposes.

The explicit marking according to the second approach of the disclosure may provide the following advantages. No special charging or accounting functionality is required in the eNB. The eNB is not required to receive PCC rules and/or detect SDFs within the bearer. The PCRF is configured to create new PCC and ADC rules that only map specific types of traffic to unlicensed (e.g., allowing video streaming in the unlicensed spectrum but not allowing file transfer over the unlicensed spectrum). The explicit marking may also provide sufficient separation between a Visited Public Land Mobile Network (VPLMN) and a HPLMN since the second approach of the disclosure does not require the HPLMN to expose the charging rules to the VPLMN.

In another aspect, the eNB may provide ratio marking to indicate the ratio of a data amount communicated over the primary cell and a data amount communicated over the secondary cell. The ratio of the data amounts between the primary and secondary cells for UL packets may be different from the ratio of the data amounts between the primary and secondary cells for DL packets, and thus separate ratio values may be provided for the UL packet and for the DL packets. In one example, 100% of DL packets (and 0% of UL packets) may be communicated on the secondary cell, whereas 100% of UL packets (and 0% of DL packets) may be communicated on the primary cell. In another example, 40% of DL packets (and 60% of UL packets) may be communicated on the secondary cell, whereas 50% of UL packets (and 50% of DL packets) may be communicated on the primary cell. The eNB makes a decision about which packets are communicated over the primary cell or which packets are communicated over the secondary cell. Such decision may depend on various factors, such as load conditions, radio conditions, local policies, visited network policies, etc.

According to this aspect, to provide for more accurate charging, the eNB marks UL packets of a data flow with an indication of the ratio of packets on UL being sent over the primary cell versus the secondary cell to the core network. In one example, the indication may include a single ratio value (e.g. 30%) which is to be interpreted by the core network as 30% of the UL packets and 30% of the DL packets are to be communicated over the secondary cell. In another example, the indication may include two ratio values (e.g., UL 30%-DL 70%), in order to provide a more precise indication of the actual ratio of packets sent over the secondary cell for UL and DL separately. The eNB may provide such indication in every packet. Alternatively, the eNB may provide such indication based on a packet interval defined by the eNB. For example, the eNB may establish the ratio and send such indication periodically based on the time interval to. In one example, the eNB may not send a new indication in the SDF UL packets until the eNB determines that the ratio has changed. As another alternative, the eNB may mark each packet with a value (e.g. 0 or 1), where each value corresponds to the signaled component (secondary cell total or UL or DL traffic) such that the ratio of the signaled component may be determined based on the ratio of the values averaged over time. For example, if the value 0 corresponds to the licensed access and the value 1 corresponds to the unlicensed access, and 40 packets are received via the unlicensed access out of 100 received packets, the core network may determine that 40% of the packets is to be communicated over the secondary cell (and 60% over the primary cell). In addition, for SDFs that may have only a DL component (and no UL components) or very few UL packets (e.g., fewer than the number of UL packets needed to report the charging information), the eNB may generate a dummy packet (e.g., with a known unroutable destination IP address) that is received by the PDN Gateway to determine the ratio. However, the PDN Gateway may not forward the dummy packet to another entity.

It may be desirable to allow the core network to instruct the RAN how to perform the marking. For example, the RAN may belong to one operator and the Core network may belong to another operator, so in order to make sure the operation works correctly, when a bearer is created, the PDN GW provides indications to the RAN of the type of marking required. Upon establishment of the data bearer, the PDN GW (based on information received by the PCRF as described in previous solution), may provide indications to the RAN of the type of marking required. The indication may include at least one of marking for each packet, marking when ratio changes more than a certain percentage, or marking at a certain packet frequency. The PDN GW may also provide the eNB with the format or destination IP address of dummy packets that the eNB may need to send for DL only SDFs.

Another aspect of the second approach implements implicit charging, where the core network (e.g., the P-GW) charges data usage of an offloadable bearer as if the data packets are routed on the secondary cell. Thus, whenever a data bearer is configured to offload the data packets to the secondary cell, the data bearer is charged as if the data packets are routed on the secondary cell. For example, when the core network authorizes an SDF to be offloaded to a secondary cell or requests the SDF to be offloaded to the secondary cell, the SDF is charged as if the SDF has been offloaded to the secondary cell, regardless of whether the SDF is actually routed over the secondary cell or not.

A third approach of the disclosure provides a mechanism associated with the AMBR. The core network (e.g. PCRF, PDN GW, or MME) selects multiple values of UE-AMBR, including at least one UE-AMBR for the primary cell (licensed access), and at least one UE-AMBR for the secondary cell (unlicensed access). For example, the core network may select one AMBR value for both DL and UL communications over the primary cell, and one AMBR value for both DL and UL communications over the secondary cell. In this example, the core network may send the multiple AMBR values to the RAN (e.g., to the eNB) with an indication of which value is for the primary cell and which value is for the secondary cell. In another example, the core network may select one AMBR value for DL communication over the primary cell, one AMBR value for UL communication over the primary cell, one AMBR value for DL communication over the secondary cell, and one AMBR value for UL communication over the secondary cell. In this example, the core network may send the multiple AMBR values to the RAN (e.g. to the eNB) with an indication of which AMBR value is for the UL communication over the primary cell, which AMBR value is for the DL communication over the primary cell, which AMBR value is for the UL communication over the secondary cell, and which AMBR value is for the DL communication over the secondary cell. The RAN (e.g. eNB) applies the AMBR values to the corresponding cells according to the indication. For example, the current messages supporting provisioning or UE-AMBR (e.g. the NAS messages including INITIAL CONTEXT SETUP REQUEST message and optional in E-RAB SETUP REQUEST, E-RAB MODIFY REQUEST, E-RAB RELEASE COMMAND) may be extended to deliver the multiple UE-AMBR values.

Figure 11:
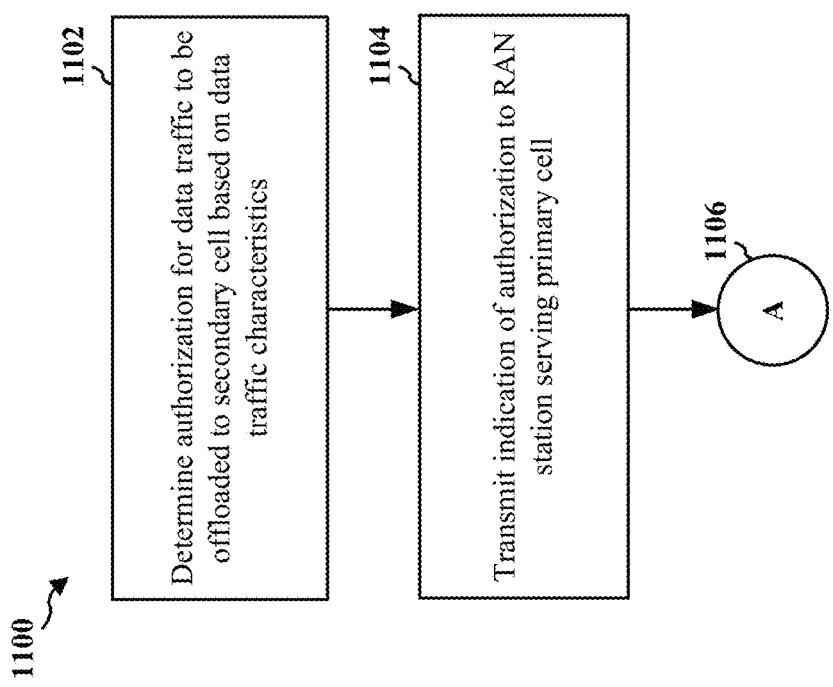
FIG. 11 is a flowchart of a method of wireless communication, according to an aspect of the disclosure.

FIG. 11 is a flowchart 1100 of a method of wireless communication, according to an aspect of the disclosure. The method may be performed by a core network entity (e.g., the PDN Gateway 418, the apparatus 1502/1502'). The core network entity is connected to a RAN including a primary cell utilizing a licensed spectrum and a secondary cell utilizing an unlicensed spectrum. At 1102, the core network entity determines an authorization for data traffic to be offloaded to the secondary cell based on data traffic characteristics. At 1104, the core network transmits an indication of the authorization to the RAN. For example, as discussed supra, the core network may be configured to make decisions on the authorization and accounting. For example, as discussed supra, the core network may be configured to determine whether data traffic of a certain device can be offloaded to the secondary cell (e.g., from the primary cell). For example, as discussed supra, to implement such authorization and accounting decisions, the core network should be able to indicate to the RAN whether specific data traffic can be offloaded to the secondary cell (or whether aggregation of the data traffic is allowed). At 1106, the core network may perform additional features, as discussed infra.

In an aspect, the indication of the authorization includes a QCI, and the QCI includes an offload indication associated with the data traffic that is authorized to be offloaded to the secondary cell. In an aspect, the QCI is separate from another QCI for data traffic transmitted over the primary cell. For example, as discussed supra, the core network assigns the new QCI value to the SDF and/or data traffic that the core network authorizes for offloading to the secondary cell. For example, as discussed supra, based on the new QCI value, the RAN (e.g. eNB) determines which data traffic may be offloaded to a secondary cell. In an aspect, the offload indication indicates that the data traffic is allowed to be offloaded. For example, as discussed supra, as a new QCI, a separate QCI called an unlicensed access QCI to an SDF, in order to indicate that the core network authorizes the data flow to be offloaded to a secondary cell. For example, as discussed supra, a (conventional) QCI is augmented to include a new QCI value indicating offloadability to the secondary cell. In an aspect, the offload indication indicates that the data traffic should be offloaded to the secondary cell whenever the secondary cell is available. For example, as discussed supra, according to another aspect, the unlicensed access QCI indicates that the core network (e.g., EPC 410) requests the data flow to be offloaded to the secondary cell (e.g., secondary cell 408) whenever the secondary cell is available. For example, as discussed supra, the new QCI value in the QCI may specify whether offloading to the SDF applies to UL communication, DL communication or both UL and DL communication for the SDF. In such an aspect, the offload indication applies to at least one of an uplink communication over the secondary cell, a downlink communication over the secondary cell, or both the uplink communication and the downlink communication over the secondary cell. For example, as discussed supra, The unlicensed access QCI may specify whether offloading to the SDF applies to UL communication, DL communication or both UL and DL communication for the SDF.

In an aspect, the indication of the authorization indicates that a bearer that is allowed to be offloaded is charged as being routed on the secondary cell. For example, as discussed supra, the core network (e.g., the P-GW) charges data usage of an offloadable bearer as if the data packets are routed on the secondary cell.

In an aspect, the core network entity determines the authorization for the data traffic to be offloaded to the secondary cell by receiving a policy associated with cell characteristics for the RAN from a PCRF, where the indication of the authorization is determined based on the received policy. In such an aspect, the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules. For example, as discussed supra, if the secondary cell is supported in the serving network, the PCRF (visited-PCRF if roaming) provides an indicator via a Gx interface to the PCEF to indicate for each flow whether the secondary cell (for the unlicensed access) may be or should be (e.g., is requested to be) used. For example, as discussed supra, the PCRF provides the indicator to indicate that the data traffic is allowed for offloading or the traffic is requested to be offloaded. For example, as discussed supra, after receiving the indicator information, the PCEF in the PDN Gateway marks the bearer(s) with an indication that the data traffic may be offloaded or should be offloaded to the secondary cell for unlicensed access.

In such an aspect, the indication of the authorization includes cell usage rules determined based on the received policy, and the primary cell and the secondary cell are utilized based on the cell usage rules. In such an aspect, the cell usage rules include at least one of a number of a percentage of data to be communicated over the secondary cell with respect to a percentage of data to be communicated over the primary cell, or a maximum amount of data to be communicated over the primary cell. For example, as discussed supra, the P-GW decides certain rules of cell-characteristic specific usage (cell-characteristic specific usage rules) based on the cell-characteristic specific policies, and forward these cell-characteristic specific usage rules to the eNB, (e.g., via the S-GW and the MME). For example, as discussed supra, the cell-characteristic specific usage rules may include, for example, a desired percentage of a data amount (e.g., 50%) transmitted over the secondary cell (in the unlicensed spectrum) with respect to a data amount transmitted over the primary cell (in the licensed spectrum). For example, as discussed supra, the cell-characteristic specific usage rules may include a maximum data amount (e.g., in bytes) allowed to be communicated over the primary cell.

In such an aspect, the policy is received for at least one of a default radio bearer activation or a dedicated radio bearer activation. For example, as discussed supra, the P-GW may provide instructions/policies on scheduling the data over the secondary cell. The instructions may be provided per EPS bearer and/or per data flow. For example, as discussed supra, the instructions may be provided during default EPS bearer activation and/or dedicated EPS bearer activation and/or default/dedicated EPS bearer modification.

In such an aspect, when there is a change in at least one of the policy or conditions associated with the cell characteristics, the policy is received from the PCRF, and the indication of the authorization is determined based on the received policy. For example, as discussed supra, the core network may initiate EPS bearer modification procedure (e.g., with the RAN) due to change of policies or conditions regarding cell-characteristic specific usage.

In an aspect, the indication of the authorization is transmitted to the RAN via an OAM protocol. For example, as discussed supra, the RAN may be configured (e.g., by the core network) with the cell-characteristic specific usage rule via the OAM function.

Figure 12:
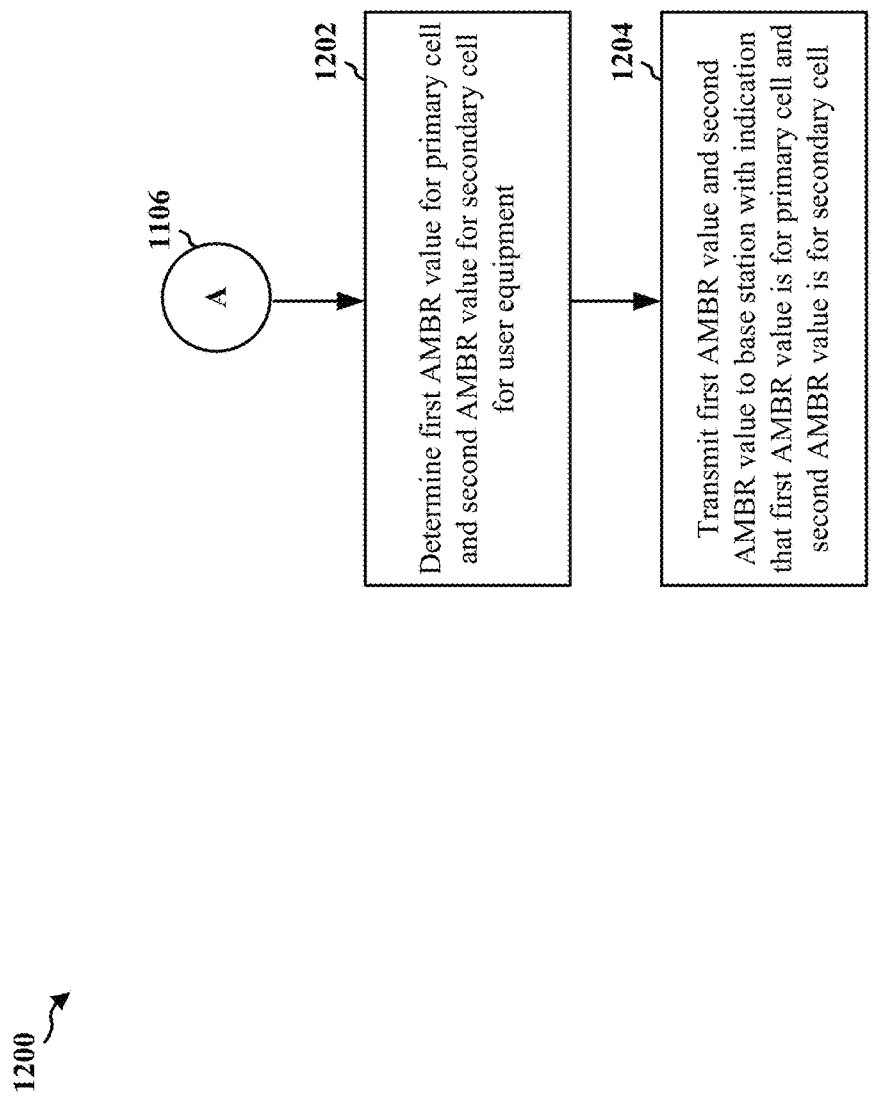
FIG. 12 is a flowchart of a method of wireless communication, expanding from the flowchart of FIG. 11.

FIG. 12 is a flowchart 1200 of a method of wireless communication, expanding from the flowchart 1100 of FIG. 11. The method may be performed by a core network entity (e.g., the PDN Gateway 418, the apparatus 1502/1502'). At 1106, the flowchart 1200 is expanded from the flowchart 1100 of FIG. 11. At 1204, the core network entity determines a first AMBR value for the primary cell and a second AMBR value for the secondary cell for a user equipment. At 1206, the core network entity transmits the first AMBR value and the second AMBR value to the RAN with an indication that the first AMBR value is for the primary cell and the second AMBR value is for the secondary cell. In an aspect, the first AMBR value includes a first uplink AMBR value and a first downlink AMBR value for the primary cell, and the second AMBR value includes a second uplink AMBR value and a second downlink AMBR value for the secondary cell. For example, as discussed supra, the core network (e.g. PCRF, PDN GW, or MME) selects multiple values of UE-AMBR, including at least one UE-AMBR for the primary cell (licensed access), and at least one UE-AMBR for the secondary cell (unlicensed access). For example, as discussed supra, core network may select one AMBR value for both DL and UL communications over the primary cell, and one AMBR value for both DL and UL communications over the secondary cell. In one example, as discussed supra, the core network may send the multiple AMBR values to the RAN (e.g., to the eNB) with an indication of which value is for the primary cell and which value is for the secondary cell. In another example, as discussed supra, the core network may select one AMBR value for DL communication over the primary cell, one AMBR value for UL communication over the primary cell, one AMBR value for DL communication over the secondary cell, and one AMBR value for UL communication over the secondary cell.

Figure 13:
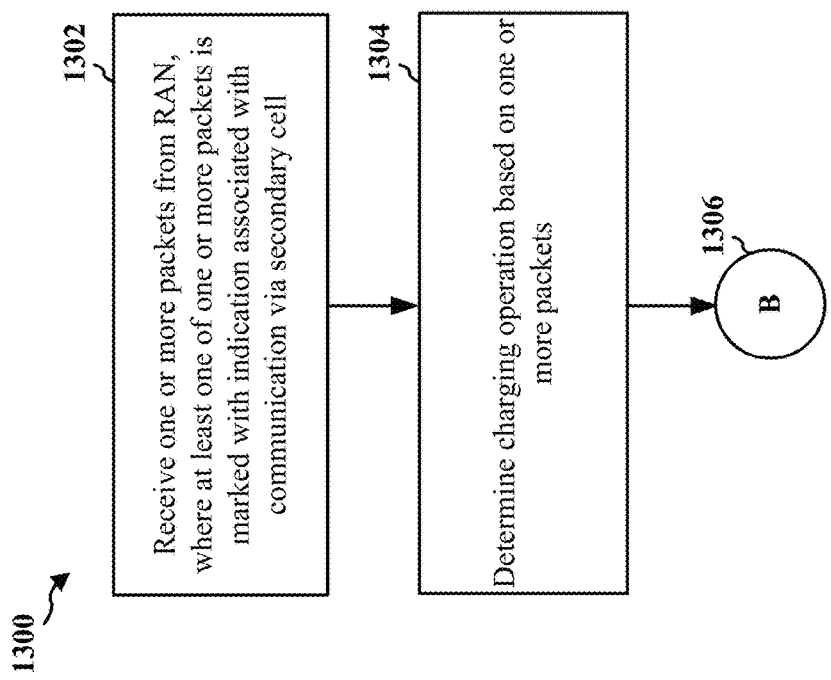
FIG. 13 is a flowchart of a method of wireless communication, according to an aspect of the disclosure.

FIG. 13 is a flowchart 1300 of a method of wireless communication, according to an aspect of the disclosure. The method may be performed by a core network entity (e.g., the PDN Gateway 418, the apparatus 1502/1502'). The core network entity is connected to a RAN including a primary cell utilizing a licensed spectrum and a secondary cell utilizing an unlicensed spectrum. At 1302, the core network entity receives one or more packets from the RAN, where at least one of the one or more packets is marked with an indication associated with communication via the secondary cell. At 1304, the core network entity determines a charging operation based on the one or more packets. For example, as discussed supra, the RAN (e.g., the eNB) may provide explicit marking by marking packets with an indication that provides information as to whether the packet has been communicated over the primary cell in the licensed spectrum or over the secondary cell in the unlicensed spectrum. For example, as discussed supra, the marking may be carried through the core network to create rules. At 1306, the core network may perform additional features, as discussed infra.

In an aspect, the indication indicates that at least a portion of the one or more packets have been communicated via the secondary cell. In such an aspect, the at least one of the one or more packets is marked by marking at least one of the one or more packets with the indication when at least a portion of a corresponding packet has been communicated via the secondary cell. For example, as discussed supra, the indication provides information as to whether the packet has been communicated over the primary cell in the licensed spectrum or over the secondary cell in the unlicensed spectrum. For example, as discussed supra, the RAN (e.g., the eNB) identifies which packets have been transported over licensed access or over unlicensed access, and marks such packets with the indication.

In an aspect, the indication includes an indication of a ratio of communication over the primary cell and communication of over the secondary cell. In such an aspect, the indication of the ratio includes a ratio value for UL communication over the secondary cell and DL communication over the secondary cell. In such an aspect, the indication of the ratio includes a UL ratio value for UL communication over the secondary cell and a DL ratio value for DL communication over the secondary cell. For example, as discussed supra, the eNB may provide ratio marking to indicate the ratio of a data amount communicated over the primary cell and a data amount communicated over the secondary cell. For example, as discussed supra, the ratio of the data amounts between the primary and secondary cells for UL packets may be different from the ratio of the data amounts between the primary and secondary cells for DL packets, and thus separate ratio values may be provided for the UL packet and for the DL packets.

In an aspect, the indication of the ratio is marked in every packet. In an aspect, the indication of the ratio is marked in a corresponding packet when there is a change in the ratio. For example, as discussed supra, to provide for more accurate charging, the eNB marks UL packets of a data flow with an indication of the ratio of packets on UL being sent over the primary cell versus the secondary cell to the core network. For example, as discussed supra, the eNB may provide such indication in every packet. Alternatively, for example, as discussed supra, the eNB may provide such indication based on a packet interval defined by the eNB. In an aspect, the one or more packets is marked with respective numerical values, each of the numerical values indicating whether the each of the one or more packets has been communicated over the primary cell or the secondary cell, where the ratio is based on the numerical values over a period of time. As another alternative, for example, as discussed supra, the eNB may mark each packet with a value (e.g. 0 or 1), where each value corresponds to the signaled component (secondary cell total or UL or DL traffic) such that the ratio of the signaled component may be determined based on the ratio of the values averaged over time. In an aspect, the one or more packets are dummy packets, each of the dummy packets including the indication of the ratio of communication over the primary cell and communication over the secondary cell, and the dummy packets are discarded by the core network entity. For example, as discussed supra, for SDFs that may have only a DL component (and no UL components) or very few UL packets (e.g., fewer than the number of UL packets needed to report the charging information), the eNB may generate a dummy packet (e.g., with a known unroutable destination IP address) that is received by the PDN Gateway to determine the ratio.

Figure 14:
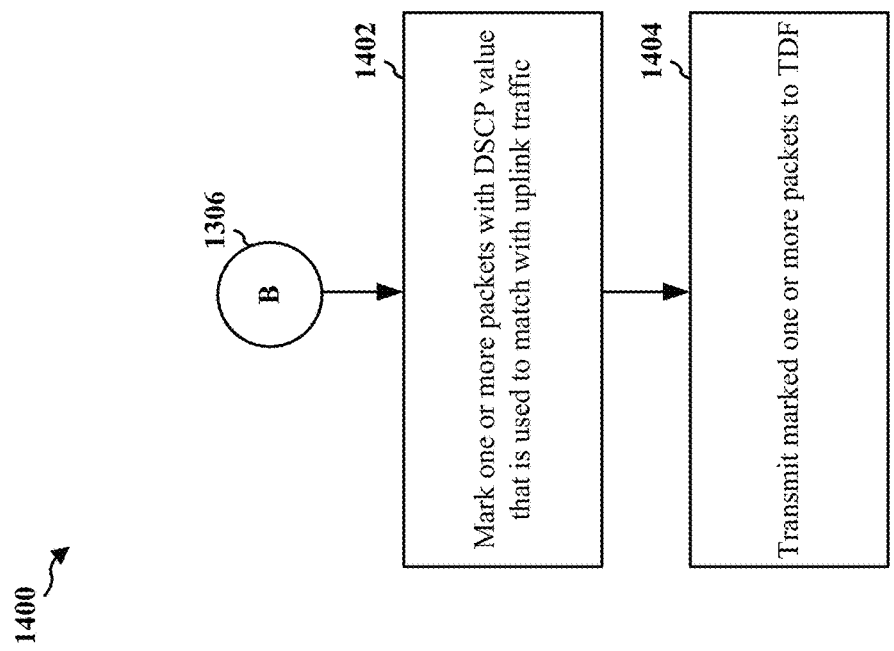
FIG. 14 is a flowchart of a method of wireless communication, expanding from the flowchart of FIG. 13.

FIG. 14 is a flowchart 1400 of a method of wireless communication, expanding from the flowchart 1300 of FIG. 13. The method may be performed by a core network entity (e.g., the PDN Gateway 418, the apparatus 1502/1502'). At 1306, the flowchart 1400 is expanded from the flowchart 1300 of FIG. 13. At 1404, the core network entity marks the one or more packets with a DSCP value that is used to match with an uplink traffic. At 1406, the core network entity transmits the marked one or more packets to a TDF. For example, as illustrated in FIG. 10, at operation 3, the P-GW 1006 marks the IP packet containing this GTP-U header with a DSCP value. For example, as illustrated in FIG. 10, at operation 3, the DSCP may transmit the marked IP packets to the TDF 1008. In an aspect, the DSCP value is used to create a first rule to mark a packet in downlink traffic with a corresponding DSCP, and a second rule to define charging and accounting instructions for a packet with the corresponding DSCP. For example, as discussed supra, the PCRF creates a new ADC rule that the TDF 1008 uses to mark packets in DL with the DSCP value. For example, as discussed supra, the PCRF creates a new PCC rule to define specific charging and accounting instructions for packets with this DSCP marking in UL and DL communication, and provides the new PCC rule to the P-GW 1006.

Figure 15:
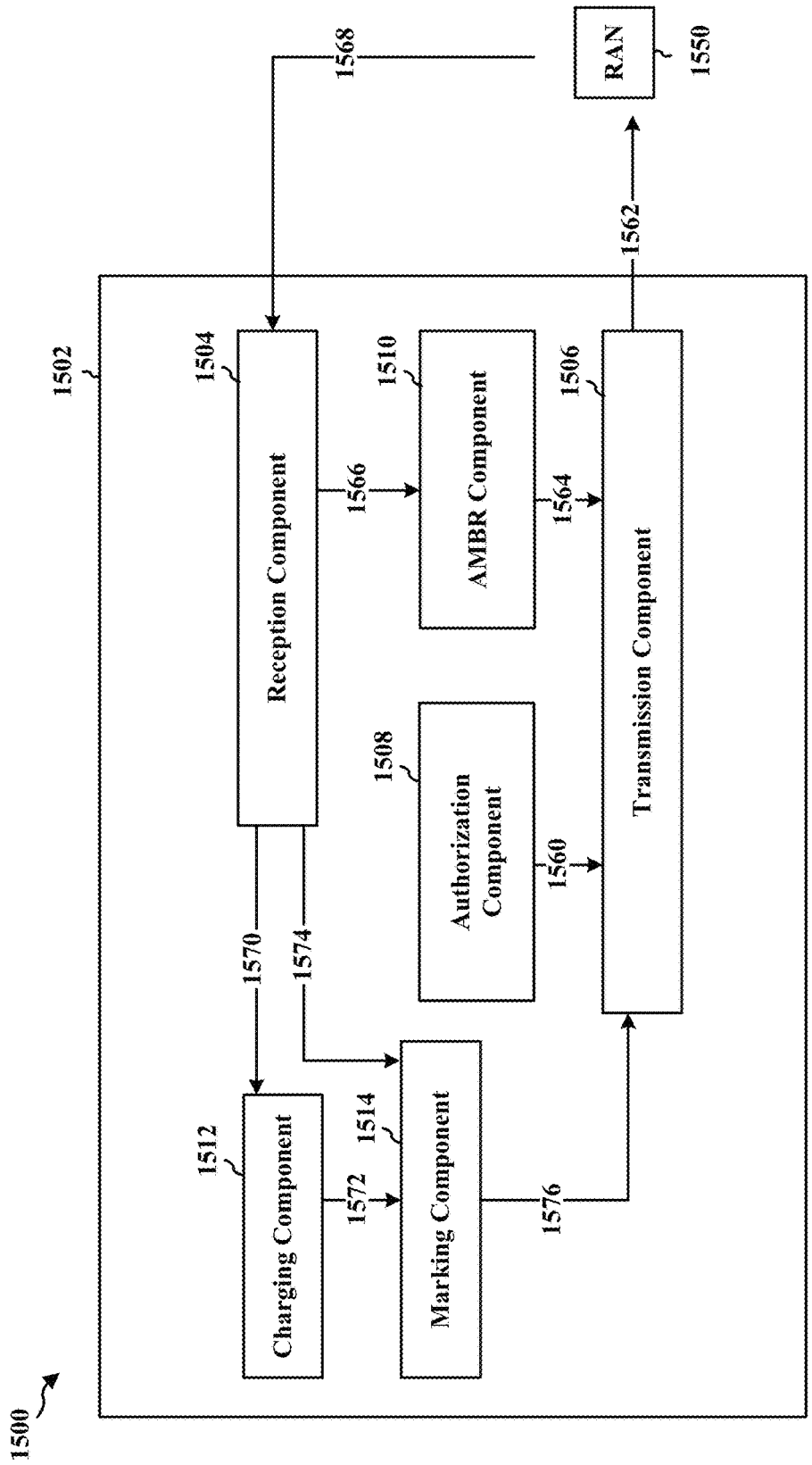
FIG. 15 is a conceptual data flow diagram illustrating the data flow between different modules/means/components in an exemplary apparatus.

FIG. 15 is a conceptual data flow diagram 1500 illustrating the data flow between different means/components in an exemplary apparatus 1502. The apparatus may be a core network entity (e.g., the PDN Gateway 418). The apparatus includes a reception component 1504, a transmission component 1506, an authorization component 1508, an AMBR component 1510, a charging component 1512, and a marking component 1514.

The core network entity is connected to a RAN (e.g., RAN 1850) including a primary cell utilizing a licensed spectrum and a secondary cell utilizing an unlicensed spectrum. According to one approach, the authorization component 1508 determines an authorization for data traffic to be offloaded to the secondary cell based on data traffic characteristics, and transmits via the transmission component 1506 an indication of the authorization to the RAN 1550, at 1560 and 1562.

In an aspect, the indication of the authorization includes a QCI, and the QCI includes an offload indication associated with the data traffic that is authorized to be offloaded to the secondary cell. In an aspect, the QCI is separate from another QCI for data traffic transmitted over the primary cell. In such an aspect, the offload indication indicates that the data traffic is allowed to be offloaded. In such an aspect, the offload indication indicates that the data traffic should be offloaded to the secondary cell whenever the secondary cell is available. In such an aspect, the offload indication applies to at least one of uplink communication over the secondary cell, downlink communication over the secondary cell, or both the uplink communication and the downlink communication over the secondary cell. In an aspect, the indication of authorization indicates that a bearer that is allowed to be offloaded is charged as being routed on the secondary cell.

In an aspect, the core network entity determines the authorization for the data traffic to be offloaded to the secondary cell by receiving a policy associated with cell characteristics for the RAN from a PCRF, where the indication of the authorization is determined based on the received policy. In such an aspect, the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules. In such an aspect, the indication of the authorization includes cell usage rules determined based on the received policy, and the primary cell and the secondary cell are utilized based on the cell usage rules. In such aspect, the indication of authorization contains information of a packet format and packet destination address to be used by the RAN to generate UL dummy packets when the communication does not have UL components or when UL packets are fewer and/or less frequent than the number of UL packets needed to report the charging information. In such an aspect, the cell usage rules include at least one of a number of a percentage of data to be communicated over the secondary cell with respect to a percentage of data to be communicated over the primary cell, or a maximum amount of data to be communicated over the primary cell. In such an aspect, the policy is received for at least one of a default radio bearer activation or a dedicated radio bearer activation. In such an aspect, when there is a change in at least one of the policy or conditions associated with the cell characteristics, the policy is received from the PCRF, and the indication of the authorization is determined based on the received policy.

In an aspect, the indication of the authorization is transmitted to the RAN via an OAM protocol.

In an aspect, the AMBR component 1510 determines a first AMBR value for the primary cell and a second AMBR value for the secondary cell for a user equipment, and transmits via the transmission component 1506 the first AMBR value and the second AMBR value to the RAN 1550 with an indication that the first AMBR value is for the primary cell and the second AMBR value is for the secondary cell, at 1564 and 1562. The AMBR component 1510 may also receive communication from the RAN 1550 via the reception component 1504, at 1568 and 1566. In an aspect, the first AMBR value includes a first uplink AMBR value and a first downlink AMBR value for the primary cell, and the second AMBR value includes a second uplink AMBR value and a second downlink AMBR value for the secondary cell.

According to another approach, the reception component 1504 receives one or more packets from the RAN 1550, at 1568, where at least one of the one or more packets is marked with an indication associated with communication via the secondary cell, and the charging component 1512 determines a charging operation based on the one or more packets (e.g., received from the reception component 1504 at 1570). The charging component 1512 may forward the one or more packets to the marking component 1514 at 1572, and/or the reception component 1504 may forward the one or more packets to the marking component 1514 at 1574.

In an aspect, the indication indicates that at least a portion of the one or more packets have been communicated via the secondary cell. In such an aspect, the at least one of the one or more packets is marked by marking each of the one or more packets with the indication when at least a portion of a corresponding packet has been communicated via the secondary cell.

In an aspect, the marking component 1514 marks the one or more packets with a DSCP value that is used to match with an uplink traffic, and transmits via the transmission component 1506 the marked one or more packets to a TDF via the RAN 1550, at 1576 and 1564. In an aspect, the DSCP value is used to create a first rule to mark a packet in downlink traffic with a corresponding DSCP, and a second rule to define charging and accounting instructions for a packet with the corresponding DSCP.

In an aspect, the indication includes an indication of a ratio of communication over the primary cell and communication of over the secondary cell. In such an aspect, the indication of the ratio includes a ratio value for UL communication over the secondary cell and DL communication over the secondary cell. In such an aspect, the indication of the ratio includes an UL ratio value for UL communication over the secondary cell and a DL ratio value for DL communication over the secondary cell. In an aspect, the indication of the ratio is marked in every packet. In an aspect, the indication of the ratio is marked in a corresponding packet when there is a change in the ratio. In an aspect, the one or more packets is marked with respective numerical values, each of the numerical values indicating whether the each of the one or more packets has been communicated over the primary cell or the secondary cell, where the ratio is based on the numerical values over a period of time.

In an aspect, the one or more packets are dummy packets, each of the dummy packets including the indication of the ratio of communication over the primary cell and communication over the secondary cell, and the dummy packets are discarded by the core network entity. For example, the one or more packets may be UL dummy packets that are generated when the communication does not have an UL component or has few UL packets (e.g., fewer than the number of UL packets needed to report the charging information). In an aspect, the dummy packets are sent by the RAN 1550 to the reception component 1504 via 1568 in a format and addressed to an address, where the format and the address are communicated by the core network to the RAN when the offloading to the secondary cell is authorized by the core network. In an aspect, upon receiving such dummy packets, the reception component 1504 utilizes the indication of the ratio of the communication over the primary cell and communication of over the secondary cell and passes it to the charging component 1512 at 1570, and the reception component 1504 discards the dummy packet.

The apparatus may include additional components that perform each of the blocks of the algorithm in the aforementioned flowcharts of FIGS. 11-14. As such, each block in the aforementioned flowcharts of FIGS. 11-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
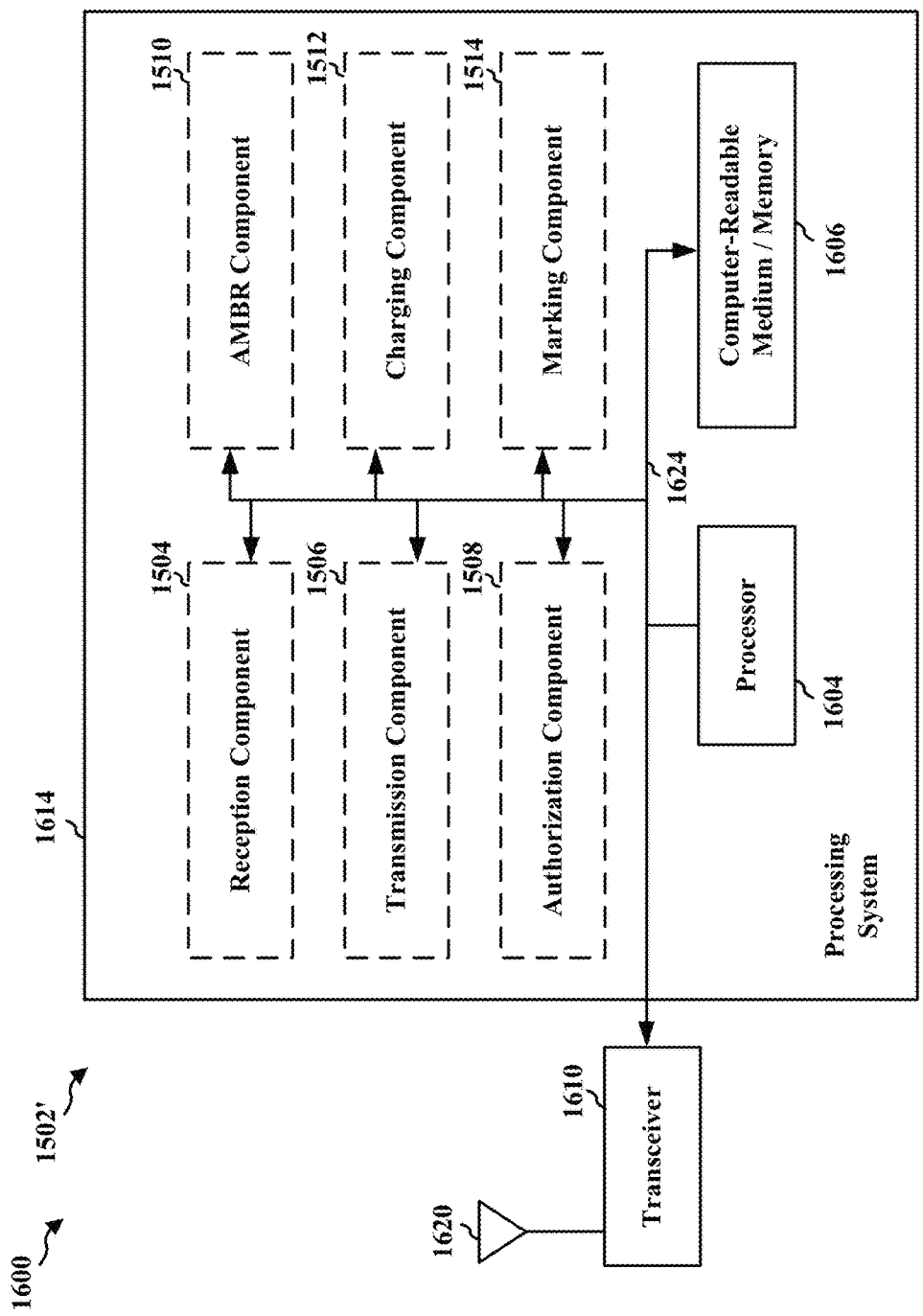
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer readable medium/memory 1606, one or more hardware components coupled to the processor 1604, or some combination thereof.

In one configuration, the apparatus 1502/1502' for wireless communication includes means for determining an authorization for data traffic to be offloaded to the secondary cell based on data traffic characteristics, means for transmitting an indication of the authorization to the RAN, means for determining a first AMBR value for the primary cell and a second AMBR value for the secondary cell for a user equipment, and means for transmitting the first AMBR value and the second AMBR value to the base station with an indication that the first AMBR value is for the primary cell and the second AMBR value is for the secondary cell. In an aspect, the apparatus 1502/1502' for wireless communication includes means for receiving one or more packets from the RAN, where at least one of the one or more packets are marked with an indication associated with communication via the secondary cell, means for determining a charging operation based on the one or more packets, means for marking the one or more packets with a DSCP value that is used to match with an uplink traffic, and means for transmitting the marked one or more packets to a TDF. The aforementioned means may be one or more of the aforementioned components of the apparatus 1502 and/or the processing system 1614 of the apparatus 1502' configured to perform the functions recited by the aforementioned means.

Figure 17:
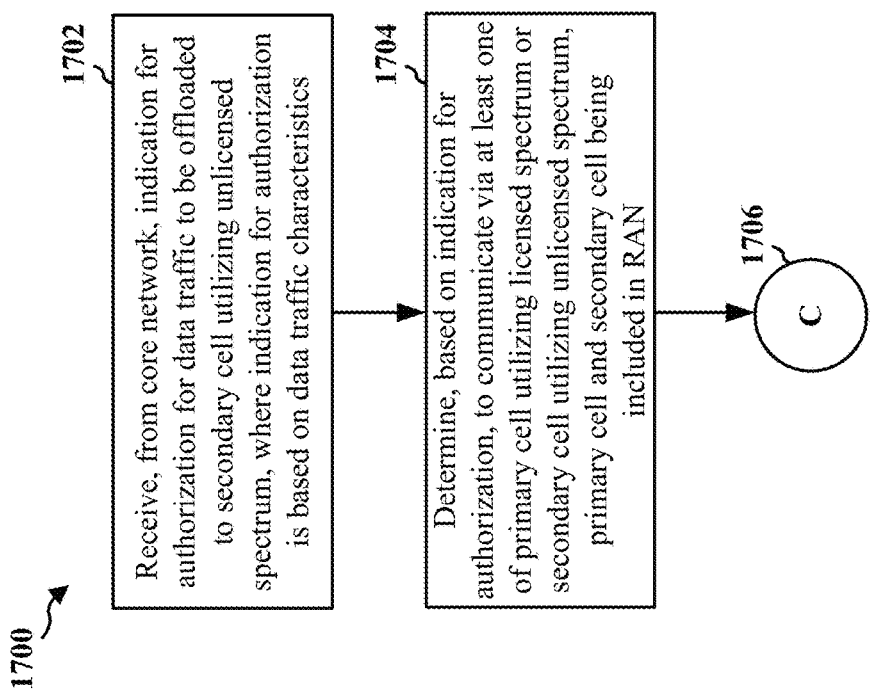
FIG. 17 is a flowchart of a method of wireless communication, according to an aspect of the disclosure.

FIG. 17 is a flowchart 1700 of a method of wireless communication, according to an aspect of the disclosure. The method may be performed by a RAN entity such as an eNB (e.g., the eNB serving the primary cell 406, the apparatus 2102/2102'). At 1702, the RAN entity receives, from a core network, an indication for authorization for data traffic to be offloaded to a secondary cell utilizing an unlicensed spectrum, where the indication for authorization is based on data traffic characteristics. At 1704, the RAN entity determines based on the indication for authorization, to communicate via at least one of a primary cell utilizing a licensed spectrum or the secondary cell utilizing the unlicensed spectrum, the primary cell and the secondary cell being included in a RAN. For example, as discussed supra, the core network may be configured to determine whether data traffic of a certain device can be offloaded to the secondary cell (e.g., from the primary cell). For example, as discussed supra, to implement such authorization and accounting decisions, the core network should be able to indicate to the RAN whether specific data traffic can be offloaded to the secondary cell (or whether aggregation of the data traffic is allowed). At 1706, the RAN entity may perform additional features, as discussed infra.

In an aspect, the indication of the authorization includes a QCI, and where the QCI includes an offload indication associated with the data traffic that is authorized to be offloaded to the secondary cell. In an aspect, the QCI is separate from another QCI for data traffic transmitted over the primary cell. For example, as discussed supra, the core network assigns the new QCI value to the SDF and/or data traffic that the core network authorizes for offloading to the secondary cell. For example, as discussed supra, based on the new QCI value, the RAN (e.g. eNB) determines which data traffic may be offloaded to a secondary cell. In an aspect, the offload indication indicates that the data traffic is allowed to be offloaded. For example, as discussed supra, as a new QCI, a separate QCI called an unlicensed access QCI to an SDF, in order to indicate that the core network authorizes the data flow to be offloaded to a secondary cell. For example, as discussed supra, a (conventional) QCI is augmented to include a new QCI value indicating offload-ability to the secondary cell. In an aspect, the offload indication indicates that the data traffic should be offloaded to the secondary cell whenever the secondary cell is available. For example, as discussed supra, according to another aspect, the unlicensed access QCI indicates that the core network (e.g., EPC 410) requests the data flow to be offloaded to the secondary cell (e.g., secondary cell 408) whenever the secondary cell is available. For example, as discussed supra, the new QCI value in the QCI may specify whether offloading to the SDF applies to UL communication, DL communication or both UL and DL communication for the SDF. In an aspect, the offload indication applies to at least one of an uplink communication over the secondary cell, a downlink communication over the secondary cell, or both the uplink communication and the downlink communication over the secondary cell. For example, as discussed supra, The unlicensed access QCI may specify whether offloading to the SDF applies to UL communication, DL communication or both UL and DL communication for the SDF.

In an aspect, the indication of authorization indicates that a bearer that is allowed to be offloaded is charged as being routed on the secondary cell. For example, as discussed supra, the core network (e.g., the P-GW) charges data usage of an offloadable bearer as if the data packets are routed on the secondary cell.

In an aspect, the indication of the authorization includes cell usage rules determined based on a policy from a PCRF, the policy being associated with cell characteristics for the RAN, and the primary cell and the secondary cell are utilized based on the cell usage rules. In such an aspect, the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules. In such an aspect, the cell usage rules include at least one of a number of a percentage of data to be communicated over the secondary cell with respect to a percentage of data to be communicated over the primary cell, or a maximum amount of data to be communicated over the primary cell. For example, as discussed supra, if the secondary cell is supported in the serving network, the PCRF (visited-PCRF if roaming) provides an indicator via a Gx interface to the PCEF to indicate for each flow whether the secondary cell (for the unlicensed access) may be or should be (e.g., is requested to be) used. For example, as discussed supra, the P-GW decides certain rules of cell-characteristic specific usage (cell-characteristic specific usage rules) based on the cell-characteristic specific policies, and forward these cell-characteristic specific usage rules to the eNB, (e.g., via the S-GW and the MME). For example, as discussed supra, the PCRF provides the indicator to indicate that the data traffic is allowed for offloading or the traffic is requested to be offloaded. For example, as discussed supra, after receiving the indicator information, the PCEF in the PDN Gateway marks the bearer(s) with an indication that the data traffic may be offloaded or should be offloaded to the secondary cell for unlicensed access. For example, as discussed supra, the cell-characteristic specific usage rules may include, for example, a desired percentage of a data amount (e.g., 50%) transmitted over the secondary cell (in the unlicensed spectrum) with respect to a data amount transmitted over the primary cell (in the licensed spectrum). For example, as discussed supra, the cell-characteristic specific usage rules may include a maximum data amount (e.g., in bytes) allowed to be communicated over the primary cell.

In such an aspect, the policy is for at least one of a default radio bearer activation or a dedicated radio bearer activation. For example, as discussed supra, the P-GW may provide instructions/policies on scheduling the data over the secondary cell. The instructions may be provided per EPS bearer and/or per data flow. For example, as discussed supra, the instructions may be provided during default EPS bearer activation and/or dedicated EPS bearer activation and/or default/dedicated EPS bearer modification.

In such an aspect, the cell usage rules are received from the MME during an S1-AP setup between the MME and the base station. In such an aspect, the cell usage rules are received from the MME via at least one of an initial context setup request or a context modification message sent from the MME. For example, as discussed supra, the MME is configured to provide the cell-characteristic specific usage rules to the RAN as an explicit indication from the MME. For example, as discussed supra, the MME provides the cell-characteristic specific usage rules during an S1-AP context setup between the MME and the eNB for every UE.

In an aspect, the indication of the authorization is received via an OAM protocol. For example, as discussed supra, the RAN may be configured (e.g., by the core network) with the cell-characteristic specific usage rule via the OAM function.

Figure 18:
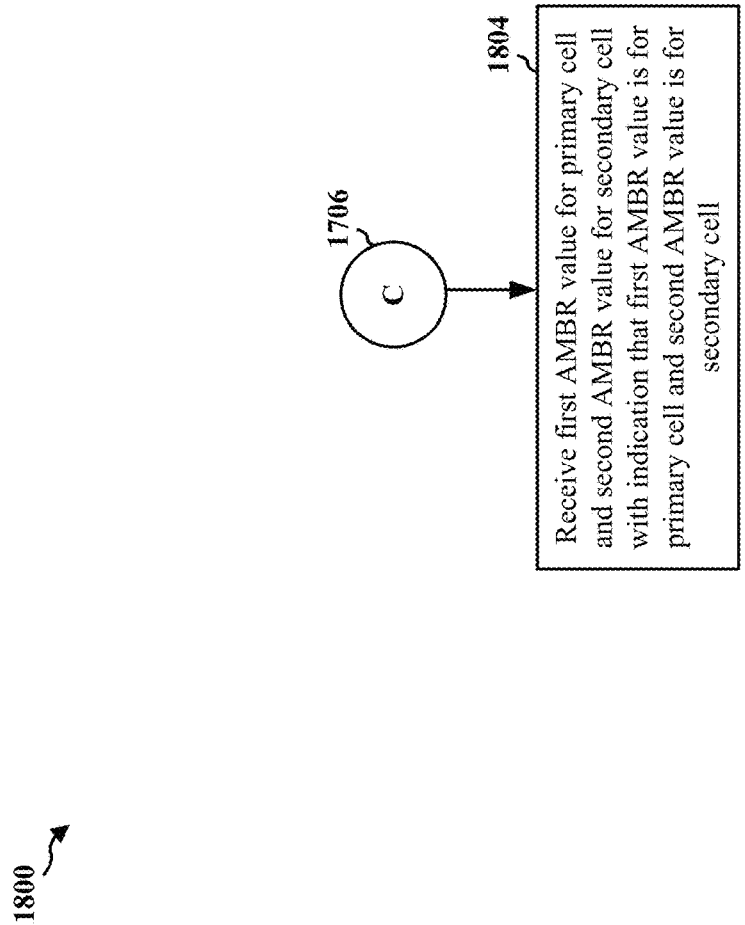
FIG. 18 is a flowchart of a method of wireless communication, expanding from the flowchart of FIG. 17.

FIG. 18 is a flowchart 1800 of a method of wireless communication, expanding from the flowchart 1700 of FIG. 17. The method may be performed by a RAN entity such as an eNB (e.g., the eNB serving the primary cell 406, the apparatus 2102/2102'). At 1706, the flowchart 1800 is expanded from the flowchart 1700 of FIG. 17. At 1804, the RAN entity receives a first AMBR value for the primary cell and a second AMBR value for the secondary cell with an indication that the first AMBR value is for the primary cell and the second AMBR value is for the secondary cell. In an aspect, the determining to communicate via at least one of the primary cell or the secondary cell is further based on at least one of the first AMBR value or the second AMBR value. In an aspect, the first AMBR value includes a first uplink AMBR value and a first downlink AMBR value for the primary cell, and the second AMBR value includes a second uplink AMBR value and a second downlink AMBR value for the secondary cell. For example, as discussed supra, the core network (e.g. PCRF, PDN GW, or MME) selects multiple values of UE-AMBR, including at least one UE-AMBR for the primary cell (licensed access), and at least one UE-AMBR for the secondary cell (unlicensed access). For example, as discussed supra, core network may select one AMBR value for both DL and UL communications over the primary cell, and one AMBR value for both DL and UL communications over the secondary cell. In one example, as discussed supra, the core network may send the multiple AMBR values to the RAN (e.g., to the eNB) with an indication of which value is for the primary cell and which value is for the secondary cell. In another example, as discussed supra, the core network may select one AMBR value for DL communication over the primary cell, one AMBR value for UL communication over the primary cell, one AMBR value for DL communication over the secondary cell, and one AMBR value for UL communication over the secondary cell.

Figure 19:
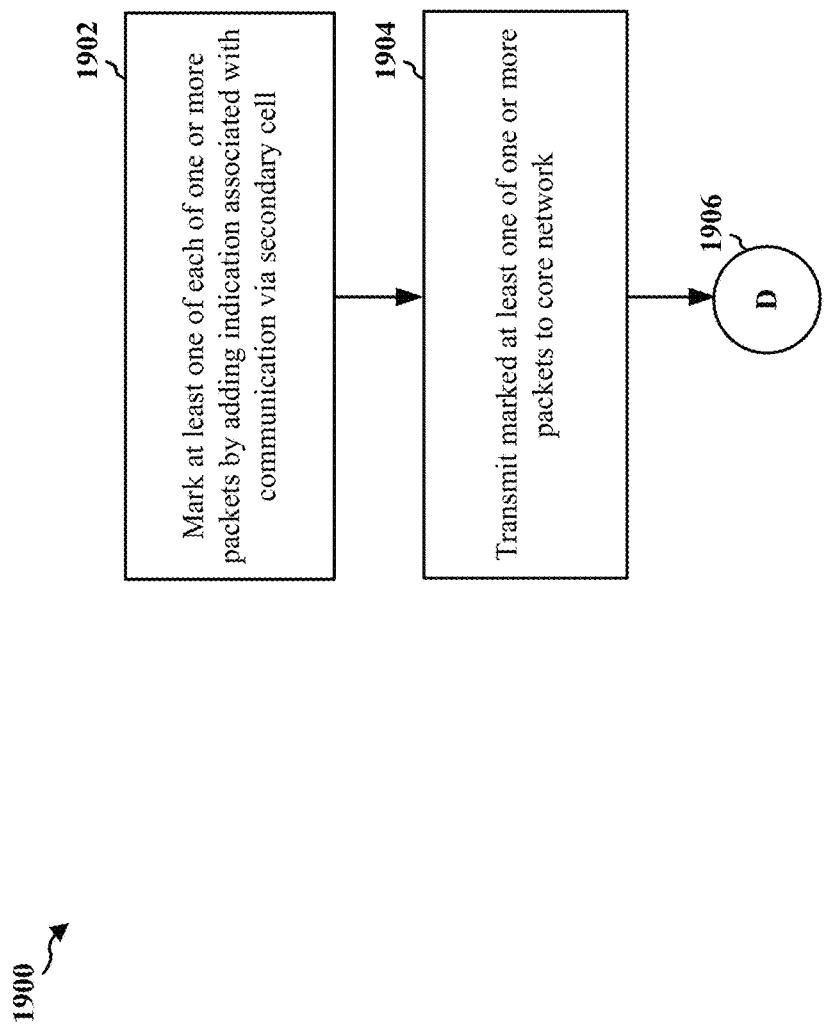
FIG. 19 is a flowchart of a method of wireless communication, according to an aspect of the disclosure.

FIG. 19 is a flowchart 1900 of a method of wireless communication, according to an aspect of the disclosure. The method may be performed by a RAN entity that includes a primary cell utilizing the licensed spectrum and a secondary cell utilizing the unlicensed spectrum. For example, the method may be performed by an RAN entity such as an eNB (e.g., the eNB serving the primary cell 406, the apparatus 2102/2102'). The RAN entity serves a primary cell in a licensed spectrum. At 1902, the RAN entity marks at least one of one or more packets by adding an indication associated with communication via the secondary cell. At 1904, the RAN entity transmits the marked at least one of one or more packets to a core network. For example, as discussed supra, the RAN (e.g., the eNB) may provide explicit marking by marking packets with an indication that provides information as to whether the packet has been communicated over the primary cell in the licensed spectrum or over the secondary cell in the unlicensed spectrum. For example, as discussed supra, the marking may be carried through the core network to create rules. At 1906, the core network may perform additional features, as discussed infra.

In an aspect, the indication indicates that at least a portion of the one or more packets have been communicated via the secondary cell. In such an aspect, the marking the at least one of the one or more packets comprises marking the at least one of the one or more packets with the indication when at least a portion of a corresponding packet has been communicated via the secondary cell. For example, as discussed supra, the indication provides information as to whether the packet has been communicated over the primary cell in the licensed spectrum or over the secondary cell in the unlicensed spectrum. For example, as discussed supra, the RAN (e.g., the eNB) identifies which packets have been transported over licensed access or over unlicensed access, and marks such packets with the indication.

In an aspect, the indication includes an indication of a ratio of communication over the primary cell and communication of over the secondary cell. In such an aspect, the indication of the ratio includes a ratio value for UL communication over the secondary cell and DL communication over the secondary cell. In such an aspect, the indication of the ratio includes an UL ratio value for UL communication over the secondary cell and a DL ratio value for DL communication over the secondary cell. For example, as discussed supra, the eNB may provide ratio marking to indicate the ratio of a data amount communicated over the primary cell and a data amount communicated over the secondary cell. For example, as discussed supra, the ratio of the data amounts between the primary and secondary cells for UL packets may be different from the ratio of the data amounts between the primary and secondary cells for DL packets, and thus separate ratio values may be provided for the UL packet and for the DL packets.

In an aspect, the indication of the ratio is marked in every packet. In an aspect, the indication of the ratio is marked in a corresponding packet when there is a change in the ratio. For example, as discussed supra, to provide for more accurate charging, the eNB marks UL packets of a data flow with an indication of the ratio of packets on UL being sent over the primary cell versus the secondary cell to the core network. For example, as discussed supra, the eNB may provide such indication in every packet. Alternatively, for example, as discussed supra, the eNB may provide such indication based on a packet interval defined by the eNB. In an aspect, the one or more packets are dummy packets, each of the dummy packets including the indication of the ratio of communication over the primary cell and communication over the secondary cell, and the dummy packets are forwarded up to a core network entity. For example, as discussed supra, for SDFs that may have only a DL component (and no UL components) or very few UL packets (e.g., fewer than the number of UL packets needed to report the charging information), the eNB may generate a dummy packet (e.g., with a known unroutable destination IP address) that is received by the PDN Gateway to determine the ratio.

Figure 20:
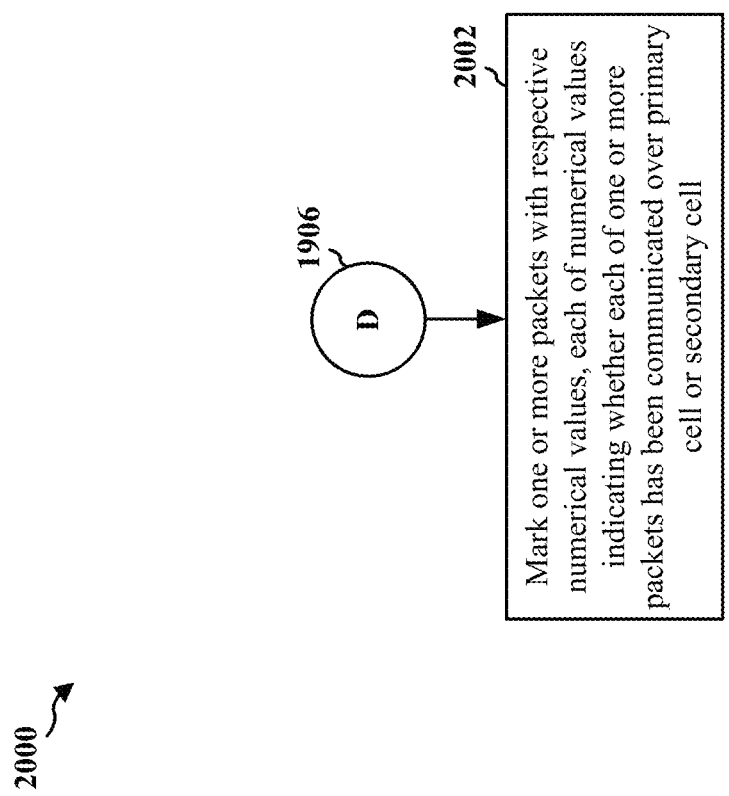
FIG. 20 is a flowchart of a method of wireless communication, expanding from the flowchart of FIG. 19.

FIG. 20 is a flowchart 2000 of a method of wireless communication, expanding from the flowchart 1900 of FIG. 19. The method may be performed by a RAN entity such as the eNB (e.g., the eNB serving the primary cell 406, the apparatus 2102/2102'). At 1906, the flowchart 2000 is expanded from the flowchart 1900 of FIG. 19. At 2002, the RAN entity marks the one or more packets with respective numerical values, each of the numerical values indicating whether the each of the one or more packets has been communicated over the primary cell or the secondary cell. In an aspect, the ratio is based on the numerical values over a period of time. For example, as discussed supra, the eNB may mark each packet with a value (e.g. 0 or 1), where each value corresponds to the signaled component (secondary cell total or UL or DL traffic) such that the ratio of the signaled component may be determined based on the ratio of the values averaged over time.

Figure 21:
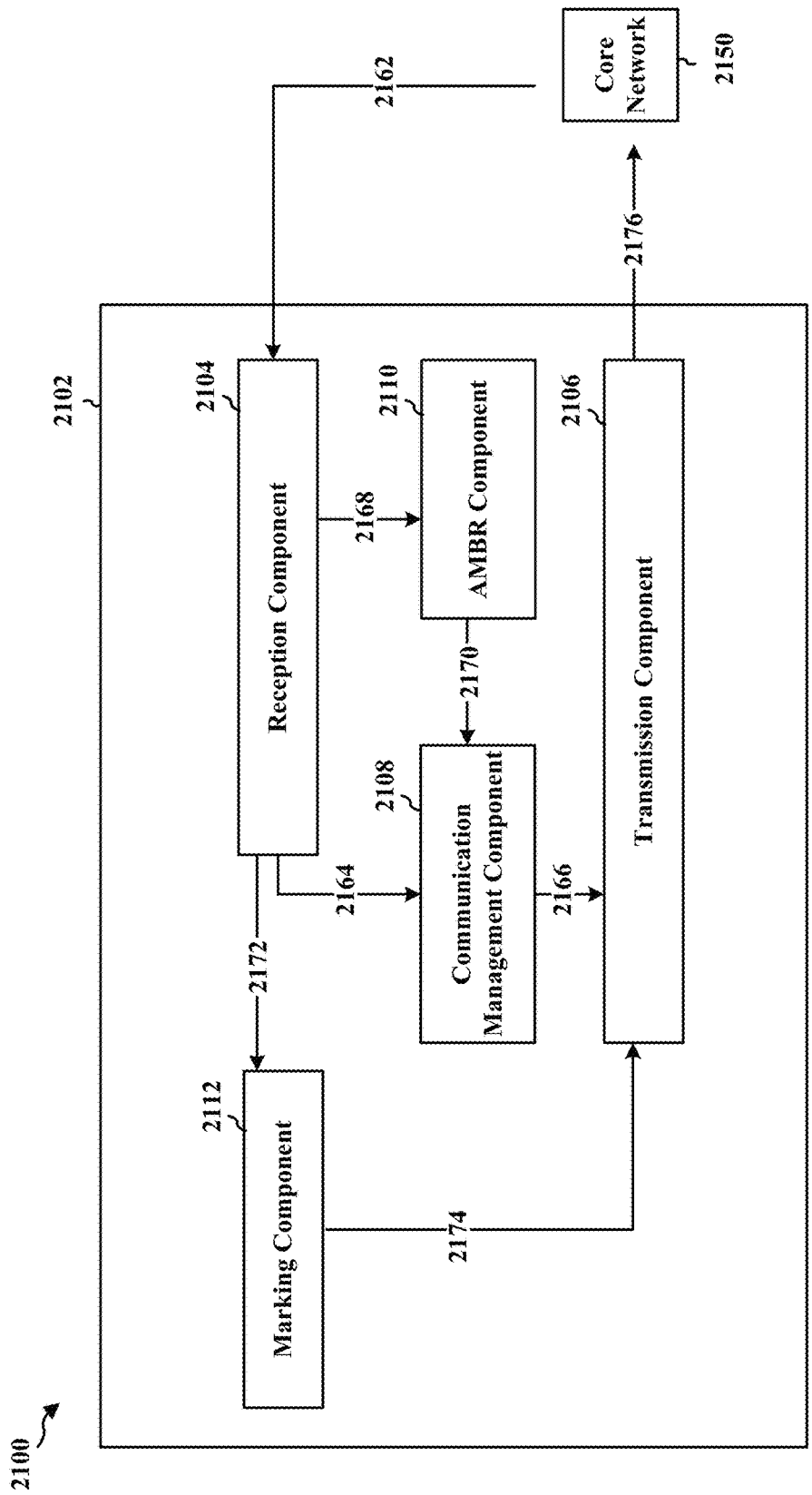
FIG. 21 is a conceptual data flow diagram illustrating the data flow between different modules/means/components in an exemplary apparatus.

FIG. 21 is a conceptual data flow diagram 2100 illustrating the data flow between different means/components in an exemplary apparatus 2102. The apparatus may be a RAN entity such as an eNB. The apparatus includes a reception component 2104, a transmission component 2106, a communication management component 2108, an AMBR component 2110, and a marking component 2112.

According to one approach, the communication management component 2108 receives via the reception component 2104, from a core network 2150, at 2162 and 2164, an indication for authorization for data traffic to be offloaded to a secondary cell utilizing an unlicensed spectrum, where the indication for authorization is based on data traffic characteristics. The communication management component 2108 determines based on the indication for authorization, to communicate via at least one of a primary cell utilizing a licensed spectrum or the secondary cell utilizing the unlicensed spectrum, the primary cell and the secondary cell being included in a RAN. The communication management component 2108 may communicate using the reception component 2104 and the transmission component, at 2164 and 2166.

In an aspect, the indication of the authorization includes a QCI, and where the QCI includes an offload indication associated with the data traffic that is authorized to be offloaded to the secondary cell. In an aspect, the QCI is separate from another QCI for data traffic transmitted over the primary cell. In an aspect, the offload indication indicates that the data traffic is allowed to be offloaded. In an aspect, the offload indication indicates that the data traffic should be offloaded to the secondary cell whenever the secondary cell is available. In an aspect, the offload indication applies to at least one of an uplink communication over the secondary cell, a downlink communication over the secondary cell, or both the uplink communication and the downlink communication over the secondary cell. In an aspect, the indication of authorization indicates that a bearer that is allowed to be offloaded is charged as being routed on the secondary cell.

In an aspect, the indication of the authorization includes cell usage rules determined based on a policy from a PCRF, the policy being associated with cell characteristics for the RAN, and the primary cell and the secondary cell are utilized based on the cell usage rules. In such an aspect, the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules. In such an aspect, the cell usage rules include at least one of a number of a percentage of data to be communicated over the secondary cell with respect to a percentage of data to be communicated over the primary cell, or a maximum amount of data to be communicated over the primary cell. In such an aspect, the policy is for at least one of a default radio bearer activation or a dedicated radio bearer activation. In such an aspect, the cell usage rules are received from the MME during every S1-AP setup between the MME and the base station. In such an aspect, the cell usage rules are received from the MME via at least one of an initial context setup request or a context modification message sent from the MME.

In an aspect, the indication of the authorization is received via an OAM protocol.

In an aspect, the AMBR component 2110 receives via the reception component 2104 a first AMBR value for the primary cell and a second AMBR value for the secondary cell with an indication that the first AMBR value is for the primary cell and the second AMBR value is for the secondary cell, at 2162 and 2168. The AMBR component 2110 may forward the first AMBR value and the second AMBR value to the communication management component 2108, at 2170. In an aspect, the communication management component 2108 may determine to communicate via at least one of the primary cell or the secondary cell further based on at least one of the first AMBR value or the second AMBR value. In an aspect, the first AMBR value includes a first uplink AMBR value and a first downlink AMBR value for the primary cell, and the second AMBR value includes a second uplink AMBR value and a second downlink AMBR value for the secondary cell.

According to another approach, where the eNB operates in the RAN that includes a primary cell utilizing the licensed spectrum and a secondary cell utilizing the unlicensed spectrum, the marking component 2112 marks at least one of one or more packets by adding an indication associated with communication via the secondary cell. The marking component 2112 may receive the one or more packets from the reception component 2104 at 2172. The marking component 2112 transmits via the transmission component 2106 the marked at least one of one or more packets to a core network 2150, at 2174 and 2176.

In an aspect, the indication indicates that at least a portion of the one or more packets have been communicated via the secondary cell. In such an aspect, the marking the at least one of the one or more packets comprises marking the at least one of the one or more packets with the indication when at least a portion of a corresponding packet has been communicated via the secondary cell.

In an aspect, the indication includes an indication of a ratio of communication over the primary cell and communication of over the secondary cell. In such an aspect, the indication of the ratio includes a ratio value for UL communication over the secondary cell and DL communication over the secondary cell. In such an aspect, the indication of the ratio includes an UL ratio value for UL communication over the secondary cell and a DL ratio value for DL communication over the secondary cell. In such an aspect, the indication of the ratio is marked in every packet. In such an aspect, the indication of the ratio is marked in a corresponding packet when there is a change in the ratio.

In an aspect, the marking component 2112 marks the one or more packets with respective numerical values, each of the numerical values indicating whether the each of the one or more packets has been communicated over the primary cell or the secondary cell. In an aspect, the ratio is based on the numerical values over a period of time. In an aspect, the one or more packets are dummy packets, each of the dummy packets including the indication of the ratio of communication over the primary cell and communication over the secondary cell, and the dummy packets are forwarded up to a core network entity. For example, the one or more packets may be UL dummy packets that are generated when the communication does not have an UL component or has few UL packets (e.g., fewer than the number of UL packets needed to report the charging information). In an aspect, the dummy packets are sent by the transmission component 2106 to the core network 2150 in a format and addressed to an address, at 2174 and 2176, where the format and the address are communicated by the core network to the RAN when the offloading to the secondary cell is authorized by the core network.

The apparatus may include additional components that perform each of the blocks of the algorithm in the aforementioned flowcharts of FIGS. 17-20. As such, each block in the aforementioned flowcharts of FIGS. 17-20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
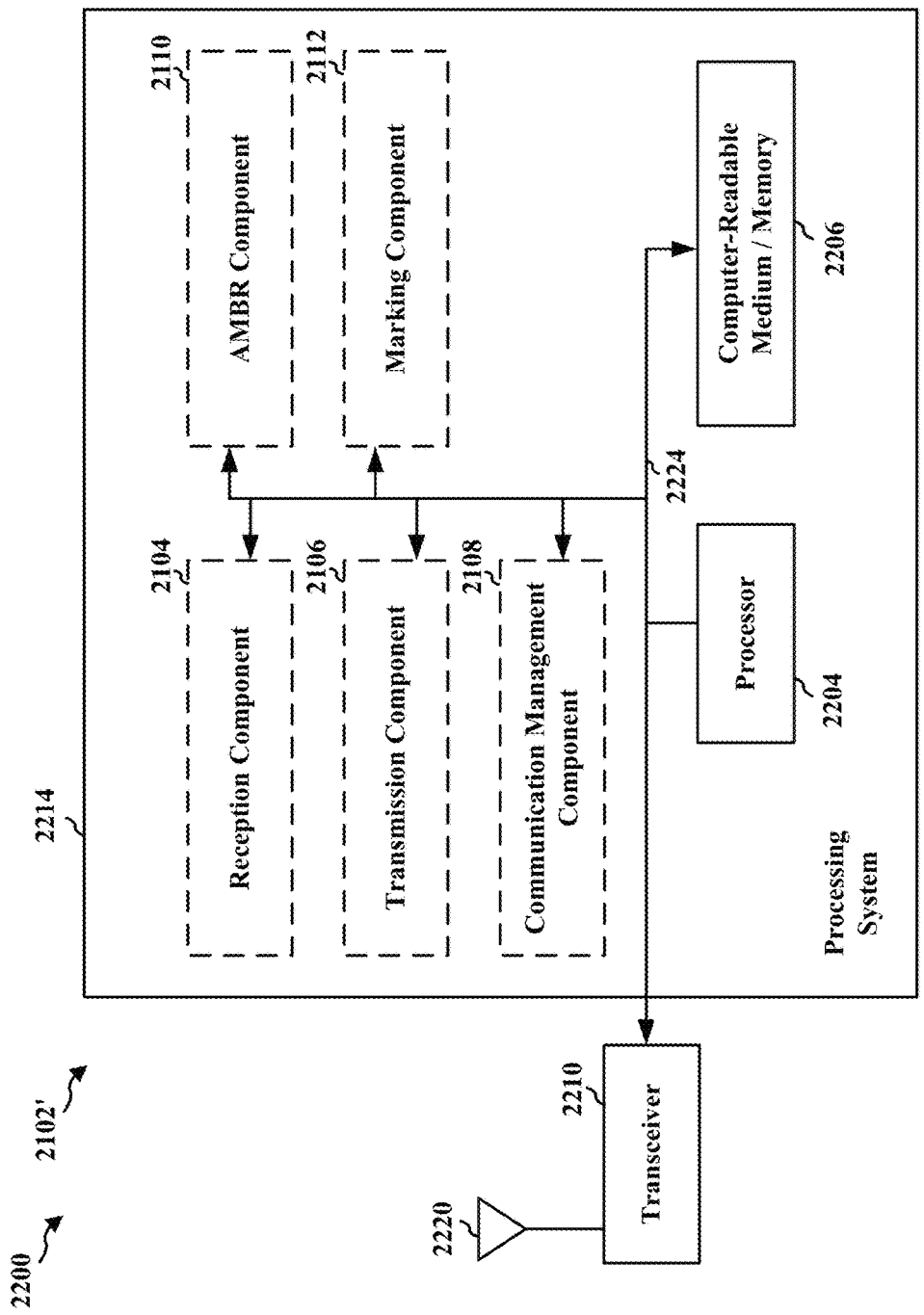
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112. The components may be software components running in the processor 2204, resident/stored in the computer readable medium/memory 2206, one or more hardware components coupled to the processor 2204, or some combination thereof. The processing system 2214 may be a component of the eNB 310 and may include the memory 376 and/or at least one of the TX processor 316, the RX processor 370, and the controller/processor 375.

In one configuration, the apparatus 2102/2102' for wireless communication includes means for means for receiving, from a core network, an indication for authorization for data traffic to be offloaded to a secondary cell utilizing an unlicensed spectrum, where the indication for authorization is based on data traffic characteristics, means for determining, based on the indication for authorization, to communicate via at least one of a primary cell utilizing a licensed spectrum or the secondary cell utilizing the unlicensed spectrum, the primary cell and the secondary cell being included in a RAN, and means for receiving a first AMBR value for the primary cell and a second AMBR value for the secondary cell with an indication that the first AMBR value is for the primary cell and the second AMBR value is for the secondary cell. In an aspect, the apparatus 2102/2102' for wireless communication includes means for marking at least one of one or more packets by adding an indication associated with communication via the secondary cell, means for transmitting the marked at least one of one or more packets to a core network, and means for marking the one or more packets with respective numerical values, each of the numerical values indicating whether the each of the one or more packets has been communicated over the primary cell or the secondary cell. The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a core network entity, wherein the core network entity is connected to a radio access network (RAN) including a primary cell utilizing a first radio access technology (RAT) and a secondary cell utilizing a second RAT, the method comprising:
   determining an authorization for data traffic to be offloaded to the secondary cell based on data traffic characteristics; and
   transmitting an indication of the authorization to the RAN;
   receiving one or more packets from the RAN, wherein the one or more packets are marked by the RAN with an indication that indicates the one or more packets have been communicated via the secondary cell; and
   updating the authorization based on the one or more packets.

2. The method of claim 1, wherein the indication of the authorization includes a quality-of-service (QoS) class identifier (QCI) that is separate from another QCI for data traffic transmitted over the primary cell, and wherein the QCI includes an offload indication associated with a descriptor that identifies the data traffic that is authorized to be offloaded to the secondary cell.

3. The method of claim 2, wherein the offload indication includes at least one of an indication that the data traffic is allowed to be offloaded or an indication that the data traffic should be offloaded to the secondary cell whenever the secondary cell is available, and
wherein the offload indication applies to at least one of an uplink communication over the secondary cell, a downlink communication over the secondary cell, or both the uplink communication over the secondary cell and the downlink communication over the secondary cell.

4. The method of claim 1, wherein the indication of the authorization indicates that a bearer that is allowed to be offloaded is charged as being routed on the secondary cell,
wherein the determining the authorization for the data traffic to be offloaded to the secondary cell comprises receiving a policy associated with cell characteristics for the RAN from a policy and charging rule function (PCRF), and
wherein the indication of the authorization is determined based on the received policy.

5. The method of claim 4, wherein the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules.

6. The method of claim 1, wherein the indication of the authorization is transmitted to the RAN via an operation, administration and maintenance (OAM) protocol.

7. The method of claim 1, further comprising:
determining a first aggregate maximum bit rate (AMBR) value for the primary cell and a second AMBR value for the secondary cell for a user equipment; and
transmitting the first AMBR value and the second AMBR value to the RAN with an indication that the first AMBR value is for the primary cell and the second AMBR value is for the secondary cell,
wherein the first AMBR value includes a first uplink AMBR value and a first downlink AMBR value for the primary cell, and the second AMBR value includes a second uplink AMBR value and a second downlink AMBR value for the secondary cell.

8. A method of wireless communication by a radio access network (RAN) entity, comprising:
receiving, from a core network, an indication for authorization for data traffic to be offloaded to a secondary cell utilizing a second radio access technology (RAT), wherein the indication for authorization is based on data traffic characteristics; and
determining, based on the indication for authorization, to communicate via at least one of a primary cell utilizing a first RAT or the secondary cell utilizing the second RAT, the primary cell and the secondary cell being included in a radio access network (RAN);
transmitting one or more packets to the core network, wherein the one or more packets are marked by the RAN with an indication that indicates the one or more packets have been communicated via the secondary cell; and
receiving updates of the authorization from the core network based on the one or more packets.

9. The method of claim 8, wherein the indication of the authorization includes a quality-of-service (QoS) class identifier (QCI) that is separate from another QCI for data traffic transmitted over the primary cell, and wherein the QCI includes an offload indication associated with the data traffic that is authorized to be offloaded to the secondary cell.

10. The method of claim 9, wherein the offload indication includes at least one of an indication that the data traffic is allowed to be offloaded or an indication that the data traffic should be offloaded to the secondary cell whenever the secondary cell is available, and
wherein the offload indication applies to at least one of an uplink communication over the secondary cell, a downlink communication over the secondary cell, or both the uplink communication over the secondary cell and the downlink communication over the secondary cell.

11. The method of claim 8, wherein the indication of authorization indicates that a bearer that is allowed to be offloaded is charged as being routed on the secondary cell, wherein the indication of the authorization includes cell usage rules determined based on a policy from a policy and charging rule function (PCRF), the policy being associated with cell characteristics for the RAN, and wherein the primary cell and the secondary cell are utilized based on the cell usage rules.

12. The method of claim 11, wherein the indication of the authorization is used for at least one of marking a radio bearer to indicate whether to utilize the primary cell or the secondary cell or both the primary cell and the secondary cell, or identifying cell usage rules determined based on the received policy, wherein the primary cell and the secondary cell are utilized based on the cell usage rules.

13. The method of claim 11, wherein the cell usage rules are received from a mobility management entity (MME) during an S1 application protocol (S1-AP) setup between the MME and the RAN entity.

14. The method of claim 11, wherein the cell usage rules are received from the MME via at least one of an initial context setup request or a context modification message sent from the MME.

15. The method of claim 8, wherein the indication of the authorization is received via an operation, administration and maintenance (OAM) protocol.

16. The method of claim 8, further comprising:
receiving a first aggregate maximum bit rate (AMBR) value for the primary cell and a second AMBR value for the secondary cell with an indication that the first AMBR value is for the primary cell and the second AMBR value is for the secondary cell,
wherein the determining to communicate via at least one of the primary cell or the secondary cell is further based on at least one of the first AMBR value or the second AMBR value, wherein the first AMBR value includes a first uplink AMBR value and a first downlink AMBR value for the primary cell, and the second AMBR value includes a second uplink AMBR value and a second downlink AMBR value for the secondary cell.

17. A method of wireless communication by a core network entity, wherein the core network entity is connected to a radio access network (RAN) including a primary cell utilizing a first radio access technology (RAT) and a secondary cell utilizing a second RAT, the method comprising:
receiving one or more packets from the RAN, wherein at least one of the one or more packets are marked by the RAN with an indication that indicates the at least one of the one or more packets have been communicated via the secondary cell for the core network entity to create cell usage rules for the primary cell and the secondary cell; and
determining a charging operation based on the one or more packets.

18. The method of claim 17, wherein the indication indicates that at least a portion of the one or more packets have been communicated via the secondary cell.

19. The method of claim 18, further comprising:
marking the one or more packets with a differentiated services code point (DSCP) value that is used to match with an uplink traffic; and
transmitting the marked one or more packets to a traffic detection function (TDF).

20. The method of claim 19, wherein the DSCP value is used to create a first rule to mark a packet in downlink traffic with a corresponding DSCP, and a second rule to define charging and accounting instructions for a packet with the corresponding DSCP.

21. The method of claim 17, wherein the indication includes an indication of a ratio of communication over the primary cell and communication of over the secondary cell, and
wherein the indication of the ratio includes at least one of:
a ratio value for UL communication over the secondary cell and DL communication over the secondary cell, or
an uplink (UL) ratio value for UL communication over the secondary cell and a downlink (DL) ratio value for DL communication over the secondary cell.

22. The method of claim 21, wherein the indication of the ratio is marked in every packet or in a corresponding packet when there is a change in the ratio.

23. The method of claim 21, wherein the one or more packets is marked with respective numerical values, each of the numerical values indicating whether the each of the one or more packets has been communicated over the primary cell or the secondary cell, and
wherein the ratio is based on the numerical values over a period of time.

24. The method of claim 21, wherein the one or more packets are dummy packets, each of the dummy packets including the indication of the ratio of communication over the primary cell and communication over the secondary cell, and
wherein the dummy packets are discarded by the core network entity.

25. A method of wireless communication by a radio access network (RAN) entity for a RAN that includes a primary cell utilizing a first radio access technology (RAT) and a secondary cell utilizing a second RAT, comprising:
marking at least one of one or more packets by adding an indication that indicates the at least one of one or more packets have been communicated via the secondary cell; and
transmitting the at least one of one or more packets with the marking to a core network for the core network to create cell usage rules for the primary cell and the secondary cell.

26. The method of claim 25, wherein the indication indicates that at least a portion of the one or more packets have been communicated via the secondary cell.

27. The method of claim 25, wherein the indication includes an indication of a ratio of communication over the primary cell and communication of over the secondary cell, and
wherein the indication of the ratio includes at least one of:
a ratio value for UL communication over the secondary cell and DL communication over the secondary cell, or
an uplink (UL) ratio value for UL communication over the secondary cell and a downlink (DL) ratio value for DL communication over the secondary cell.

28. The method of claim 27, wherein the indication of the ratio is marked in every packet or in a corresponding packet when there is a change in the ratio.

29. The method of claim 27, further comprising:
marking the one or more packets with respective numerical values, each of the numerical values indicating whether the each of the one or more packets has been communicated over the primary cell or the secondary cell,
wherein the ratio is based on the numerical values over a period of time.

30. The method of claim 27, wherein the one or more packets are dummy packets, each of the dummy packets including the indication of the ratio of communication over the primary cell and communication over the secondary cell, and
wherein the dummy packets are forwarded up to a core network entity.

* * * * *